United States Patent
Sato et al.

(10) Patent No.: US 6,403,513 B1
(45) Date of Patent: Jun. 11, 2002

(54) DIELECTRIC CERAMIC COMPOSITION AND ELECTRONIC DEVICE

(75) Inventors: Shigeki Sato; Yoshinori Fujikawa; Yoshihiro Terada, all of Tokyo (JP)

(73) Assignee: TDK Corporation, Tokyo (JP)

( * ) Notice: Subject to any disclaimer, the term of this patent is extended or adjusted under 35 U.S.C. 154(b) by 21 days.

(21) Appl. No.: 09/689,707

(22) Filed: Oct. 13, 2000

Related U.S. Application Data

(63) Continuation of application No. 09/361,311, filed on Jul. 27, 1999, now Pat. No. 6,226,172.

(30) Foreign Application Priority Data

Oct. 19, 1999 (JP) .......................................... 11-297269
Jul. 27, 2000 (JP) ....................................... 2000-226862

(51) Int. Cl.$^7$ ........................ H01G 4/10; C04B 35/468
(52) U.S. Cl. .................... 501/137; 501/139; 361/321.3; 361/321.4; 361/321.5
(58) Field of Search ................................ 501/137, 139; 361/321.4, 321.5, 321.3

(56) References Cited

U.S. PATENT DOCUMENTS 6,226,172 B1 * 5/2001 Sato et al. .................. 361/311

FOREIGN PATENT DOCUMENTS

| JP | 4-292458 | 10/1992 |
|----|----------|---------|
| JP | 4-292459 | 10/1992 |
| JP | 4-295048 | 10/1992 |
| JP | 5-109319 | 4/1993 |
| JP | 06-243721 | 9/1994 |
| JP | 9-40465 | 2/1997 |
| JP | 2000-154057 | 6/2000 |

* cited by examiner

*Primary Examiner*—David Brunsman
(74) *Attorney, Agent, or Firm*—Oliff & Berridge, PLC

(57) ABSTRACT

A dielectric ceramic composition comprising a main component of composed mainly of barium titanate, a first subcomponent including at least one compound selected from MgO, CaO, BaO, SrO and $Cr_2O_3$, a second subcomponent containing silicone oxide as a main composition, a third subcomponent including at least one compound selected from $V_2O_5$, $MoO_3$, and $WO_3$, a fourth subcomponent including an oxide of R1 (where R1 is at least one element selected from Sc, Er, Tm, Yb, and Lu), and a fifth subcomponent including $CaZrO_3$ or $CaO+ZrO_2$, wherein the ratios of the subcomponents to 100 moles of the main component of composed mainly of barium titanate are the first subcomponent of 0.1 to 3 moles, the second subcomponent of 2 to 10 moles, the third subcomponent of 0.01 to 0.5 moles, the fourth subcomponent of 0.5 to 7 moles (where the number of moles of the fourth subcomponent is the ratio of R1 alone), and the fifth subcomponent of 0<fifth subcomponent$\leq$5 moles. According to the dielectric ceramic composition, the permittivity is high and the capacity-temperature characteristics can fulfill the X8R characteristics of the EIA standard (within the range of −55 to 150° C. and $\Delta C=\pm15\%$), and firing in a reduced atmosphere is possible.

38 Claims, 14 Drawing Sheets

DIELECTRIC CERAMIC COMPOSITION AND ELECTRONIC DEVICE

This is a continuation of U.S. Ser. No. 09/361,311 filed Jul. 27, 1999 now U.S. Pat. No. 6,226,172.

BACKGROUND OF THE INVENTION

1. Field of the Invention

The present invention relates to a dielectric ceramic composition having a resistance to reduction and to a multi-layer ceramic capacitor or other electronic device using the same.

2. Description of the Related Art

A multi-layer ceramic capacitor, one type of electronic device, is broadly used as a compact, large capacity, high reliability electronic device. The number used in each piece of electronic equipment has also increased. In recent years, along with increasing miniaturization and improved equipment performance, there has been increasingly stronger demand for further reductions in size, increases in capacity, reductions in price and improvements in reliability in multi-layer ceramic capacitors.

Multi-layer ceramic capacitors are normally produced by stacking a paste for forming the internal electrode layers and a paste for forming the dielectric layers using the sheet method or printing method, etc. and then co-firing the internal electrode layers and dielectric layers in the stack together.

As the electroconductive material for the internal electrode layers, generally Pd or a Pd alloy is used, but since Pd is high in price, relatively inexpensive Ni, Ni alloys, and other base metals have come into use. When using a base metal as the electroconductive material of the internal electrode layers, firing in the atmosphere ends up oxidizing the internal electrode layers and therefore the co-firing of the dielectric layers and internal electrode layers has to be done in a reducing atmosphere. When being fired in a reducing atmosphere, however, the dielectric layers end up being reduced and becoming lower in specific resistance. Therefore, non-reducing type dielectric materials are being developed.

In multi-layer ceramic capacitors using a dielectric ceramic composition, insulation resistence (IR) remarkably deteriorates when an electric field is applied, more specifically, there is a disadvantage in that an IR lifetime is short and the credibility is low.

There also arises a disadvantage that when the dielectric composition is exposed to a direct-current electric field, a permittivity ∈r declines over time. Also, a superimposed direct-current voltage is used for a capacitor in some cases and there is a disadvantage that when a direct-current voltage is applied to a capacitor having a dielectric composition wherein a strong dielectric composition is a main composition, a capacitor value generally declines (DC bias characteristics). When a dielectric composition layer is made thinner in order to make a chip capacitor more compact and larger in capacity, an electric field affecting the dielectric composition layer at the time of applying a direct-current voltage becomes strong, so the permittivity ∈r is liable to change over time, that is, the capacitor change over time becomes remarkably large and DC bias characteristics declines.

Further, a capacitor is also required to have excellent temperature characteristics. In particular, in some applications, it is desired that the temperature characteristics be smooth under harsh conditions. In recent years, multi-layer ceramic capacitors have come into use for various types of electronic equipments such as the engine electronic control units (ECU) mounted in engine compartments of automobiles, crank angle sensors, antilock brake system (ABS) modules, etc. These types of electronic equipment are used for stabilizing engine control, drive control, and brake control, and therefore are required to have excellent circuit temperature stability.

The environment in which these types of electronic equipment are used is envisioned to be one in which the temperature falls to as low as −20° C. or so in the winter in cold areas or the temperature rises to as high as +130° C. or so in the summer right after engine startup. Recently, there has been a trend toward reduction of the number of wire harnesses used for connecting electronic apparatuses and the equipment they control. Electronic apparatuses are also being mounted outside of the vehicles in some cases. Therefore, the environment is becoming increasingly severe for electronic apparatuses. Accordingly, capacitors used for these electronic apparatuses have to have smooth temperature characteristics over a broad temperature range.

Temperature-compensating capacitor materials superior in temperature characteristics such as, $(Sr, Ca)(Ti, Zr)O_3$ based, $Ca(Ti, Zr)O_3$ based, $Nd_2O_3$—$2TiO_2$ based, $La_2O_3$—$2TiO_2$ based, and other materials are generally known, but these compositions have extremely low permittivitys (generally less than 100), so it is substantially impossible to produce a capacitor having a large capacity.

To create dielectric ceramic compositions having a high dielectric constant and a smooth capacity-temperature characteristics, compositions comprised of $BaTiO_3$ as a main component plus $Nb_2O_5$—$Co_3O_4$, MgO—Y, rare earth elements (Dy, Ho, etc.), $Bi_2O_3$—$TiO_2$, etc. are known. Looking at the temperature characteristics of a dielectric ceramic composition comprising $BaTiO_3$ as a main component, where the Curie temperature of pure $BaTiO_3$ is close to about 130° C., it is extremely difficult to satisfy the R characteristic of the capacity-temperature characteristic (ΔC=+15% or less) in the region higher in temperature than that. Therefore, a $BaTiO_3$ based high dielectric constant material can only satisfy the X7R characteristic of the EIA standard (−55 to 125° C., ΔC=+15% or less). By only satisfying the X7R characteristic, the material is not good enough to be used in an electronic apparatus of an automobile which is used in the above-mentioned harsh environments. The above electronic apparatus requires a dielectric ceramic composition satisfying the X8R characteristic of the EIA standard (−55 to 150° C., ΔC=±15% or less).

To satisfy the X8R characteristic in a dielectric ceramic composition comprised of $BaTiO_3$ as a main component, it has been proposed to shift the Curie temperature to the high temperature side by replacing the Ba in the $BaTiO_3$ with Bi, Pb, etc. (Japanese Unexamined Patent Publication (Kokai) No. 1998-25157 and No. 1997-40465). Further, it has also been proposed to satisfy the X8R characteristic by selecting a $BaTiO_3$+$CaZrO_3$+ZnO+$Nb_2O_5$ based composition (Japanese Unexamined Patent Publication (Kokai) No. 1992-295048, No. 1992-292458, No. 1992-292459, No. 1993-109319, and No. 1994-243721).

In each of these compositions, however, Pb, Bi, and Zn are easily vaporized and scattered making, firing in air or another oxidizing atmosphere a prerequisite. Therefore, there are the problems that it is not possible to use an inexpensive base metal such as Ni for the internal electrodes of the capacitor and it is necessary to use Pd, Au, Ag, or another high priced precious metals.

SUMMARY OF THE INVENTION

An object of the present invention is to provide a dielectric ceramic composition having a high permittivity, having a capacity-temperature characteristic satisfying the X8R characteristic of the EIA standard (−55 to 150° C., ΔC=+ 15% or less), able to be fired in a reducing atmosphere, and further, to provide a multi-layer ceramic capacitor or other electronic device using this dielectric ceramic composition.

To attain the above object, a dielectric ceramic composition according to the first aspect of the present invention comprises:
  a main component composed mainly of barium titanate,
  a first subcomponent including at least one compound selected from MgO, CaO, BaO, SrO and $Cr_2O_3$,
  a second subcomponent containing silicone oxide as a main composition,
  a third subcomponent including at least one compound selected from $V_2O_5$, $MoO_3$, and $WO_3$,
  a fourth subcomponent including an oxide of R1 (where R1 is at least one element selected from Sc, Er, Tm, Yb, and Lu), and
  a fifth subcomponent including $CaZrO_3$ or $CaO+ZrO_2$,
  wherein the ratios of the subcomponents to 100 moles of the main component composed mainly of barium titanate are:
    the first subcomponent: 0.1 to 3 moles,
    the second subcomponent: 2 to 10 moles,
    the third subcomponent: 0.01 to 0.5 moles,
    the fourth subcomponent: 0.5 to 7 moles (where the number of moles of the fourth subcomponent is the ratio of R1 alone), and
    the fifth subcomponent: 0<fifth subcomponent≦5 moles.

Preferably, in the dielectric ceramic composition according to the present invention, when the number of moles of the fourth subcomponent and the fifth subcomponent with respect to 100 moles of the main component composed mainly of barium titanate (note that the mole number of the fourth subcomponent is the ratio of R1 alone) is expressed by X, Y coordinates, the number of moles of the fourth subcomponent and the fifth subcomponent have the relationship of being within the range surrounded by straight lines of Y=5, Y=0, Y=(2/3)X−(7/3), X=0.5 and X=5 (where the boundary of Y=0 is not included).

Preferably, in the dielectric ceramic composition according to the present invention, when the number of moles of the fourth subcomponent and the fifth subcomponent with respect to 100 moles of the main component composed mainly of barium titanate (where the mole number of the fourth subcomponent is the ratio of R1 alone) is expressed by X, Y coordinates, the number of moles of the fourth subcomponent and the fifth subcomponent have the relationship of being within the range surrounded by straight lines of Y=5, Y=0, Y=(2/3)X−(7/3), Y=−(1.5)X+9.5, X=1 and X=5 (where the boundary of Y=0 is not included and boundaries other than Y=0 are included).

Preferably, the dielectric ceramic composition according to the present invention, further comprising a sixth subcomponent an oxide of R2 (where the R2 is at least one element selected from Y, Dy, Ho, Tb, Gd and Eu) and an amount of said sixth subcomponent is not more than 9 moles with respect to 100 moles of the main component composed mainly of barium titanate (where the mole number of the sixth subcomponent is the ratio of R2 alone).

Preferably, a total amount of the fourth subcomponent and the sixth subcomponent is not more than 13 moles with respect to 100 moles of main component composed mainly of barium titanate (where the mole numbers of the fourth subcomponent and sixth subcomponent are respectively the ratios of R1 and R2 alone), more preferably, not more than 10 moles.

Preferably, said second subcomponent is at least one compound selected from $SiO_2$, MO (where M is at least one element selected from Ba, Ca, Sr and Mg), $Li_2O$ and $B_2O_3$.

More preferably, said second subcomponent is expressed by $(Ba, Ca)_xSiO_{2+x}$(note x=0.7 to 1.2). The second subcomponent is considered to function as a sintering promotion agent.

In the above fifth subcomponent, the mole ratio of Ca and Zr can be any, but preferably, Ca/Zr=0.5 to 1.5, more preferably, Ca/Zr=0.8 to 1.5, furthermore preferably, Ca/Zr= 0.9 to 1.1.

Preferably, the dielectric ceramic composition according to the present invention, further comprising a seventh subcomponent MnO, the amount of the seventh subcomponent being not more than 0.5 moles with respect to 100 moles of the main component composed mainly of barium titanate.

To attain the above object, a dielectric ceramic composition according to a second aspect of the present invention comprises:
  a main component composed mainly of barium titanate, wherein
    when a value of a heat flow difference (dq/dt) per an unit time measured by the DSC (differential scan calorimetry), which is differentiated by a temperature, is defined as a DDSC (Differential Calorimetry Differentiated by Temperature), a temperature difference between a pair of peaks existing on the both sides of the Curie temperature is not less than 4.1° C. in a graph showing the relationship between temperature and the DDSC (Differential Calorimetry Differentiated by Temperature).

Note that in a graph showing the relationship of the temperature and the DDSC (Differential Calorimetry Differentiated by Temperature), in the case where peaks are not clear, a dielectric ceramic composition having a half-width of 4.1° C. or more in the graph corresponds to that according to the second aspect of the present invention. The half value composition assumes a base line of a heat absorbing peak in the graph showing the relationship between temperature and the DDSC (Differential Calorimetry Differentiated by Temperature), and is defined as a temperature difference between two points sandwiching a peak in which the two points form a straight line parallel to the base line and having a width of ½ of the width of the base line.

To attain the above object, a dielectric ceramic composition according to a third aspect of the present invention comprises:
  a main component composed mainly of barium titanate, wherein:
    a pseudo cubic peak including a peak of a (002) crystal surface and a peak of a (200) crystal surface is observed in a range 2θ=44° to 46° in an X-ray diffraction using a Cu—kα line;
    a half-width of said pseudo cubic peak is not less than 0.3° at room temperature; and
    when determining the intensity of said peak of the (002) crystal surface is I(002) and the intensity of said peak of the (200) crystal surface is I(200), I(002)≧I(200).

To attain the above object, a dielectric ceramic composition according to a fourth aspect of the present invention comprises:

a main component composed mainly of barium titanate, wherein:
a pseudo cubic peak including a peak of a (004) crystal surface and a peak of a (400) crystal surface is observed in a range 2θ=98° to 103° in an X-ray diffraction using a Cu—Kα line; and
a half-width of said pseudo cubic peak is not less than 0.4° at 120° C.

To attain the above object, a dielectric ceramic composition according to a fifth aspect of the present invention comprises:

a main component composed mainly of barium titanate, wherein:
when the dielectric ceramic composition is measured by means of a Raman spectrum method using various sample temperatures, the intensity of the Raman peak at 270 cm$^{-1}$ and 130° C. is defined as $I_{270}$ and the intensity of the Raman peak at 310 cm$^{-1}$ and 130° C. is defined as $I_{310}$, $0.1 \leq (I_{310}/I_{270})$.

To attain the above object, a dielectric ceramic composition according to a sixth aspect of the present invention comprises:

a main component composed mainly of barium titanate, wherein:
when the dielectric ceramic composition is measured by means of a Raman spectrum method using various sample temperatures, A half-width of the Raman peak at 535 cm$^{-1}$ is not more than 95 cm$^{-1}$ at the sample temperature of 130° C.

Preferably, in dielectric ceramic compositions according to the first to sixth aspects, barium titanate is expressed by a composition formula of $Ba_mTiO_{2+m}$, wherein m in the composition formula is $0.995 \leq m \leq 1.010$, and the ratio of Ba and Ti is $0.995 \leq Ba/Ti \leq 1.010$.

An electric device according to the present invention is not specifically limited as far as it includes a dielectric layer, and for example a multi-layer ceramic capacitor device having a capacitor device body wherein dielectric layers and internal electrode layers are alternately layered. In the present invention, the dielectric layer is composed of any of the above dielectric ceramic compositions. A conductive material included in the internal electrode layer is not specifically limited, but is for example Ni or a Ni alloy.

Effects

A dielectric ceramic composition according to the present invention has a high permittivity, satisfying the X8R characteristic of the EIA standard (−55 to 150° C., ΔC=±15% or less), and is able to be fired in a reducing atmosphere, and further, has a small change of capacity over time when under a direct-current electric field.

Also, a dielectric ceramic composition according to the present invention has a long insulation resistence life, furthermore, DC bias characteristics (direct-current voltage application dependency of the dielectric constant) and TC bias characteristics (capacity-temperature characteristics at the time of direct-current application) are stable.

Accordingly, by using the dielectric ceramic composition of the present invention, it becomes eaier to provide an interlayer ceramic capacitor and other electric devices having excellent characteristics.

Namely, since interlayer ceramic capacitors and other electric devices having a dielectric composition layer comprised of the dielectric ceramic composition of the present invention are able to stably operate in a variety of apparatuses used under hard circumstances, such as electric apparatuses in vehicles, the credibility of those apparatuses to which the same is applied is remarkably improved.

Furthermore, the temperature characteristics of a ceramic composition of an X8R characteristic material of the related art is liable to be deteriorated by making the film thinner, and the X7R characteristics cannot be satisfied particularly when an interlayer is not more than 5 μm in some cases. On the contrary, the present invention is also effective in improving the temperature characteristics in the case of such thinner films.

The present disclosure relates to subject matter contained in Japanese Patent Application No. 1999-297269 (filed on October 19) and No. 2000-226862 (filed on July 27), the disclosure of which is expressly incorporated herein by reference in its entirety.

BRIEF DESCRIPTION OF THE DRAWINGS

These and other objects and features of the present invention will become clearer from the following description of the preferred embodiments given with reference to the attached drawings, in which.

DESCRIPTION OF THE PREFERRED EMBODIMENTS

Below, the present invention will be explained based on an embodiment shown in drawings.

Multi-layer Ceramic Capacitor

Figure 1:
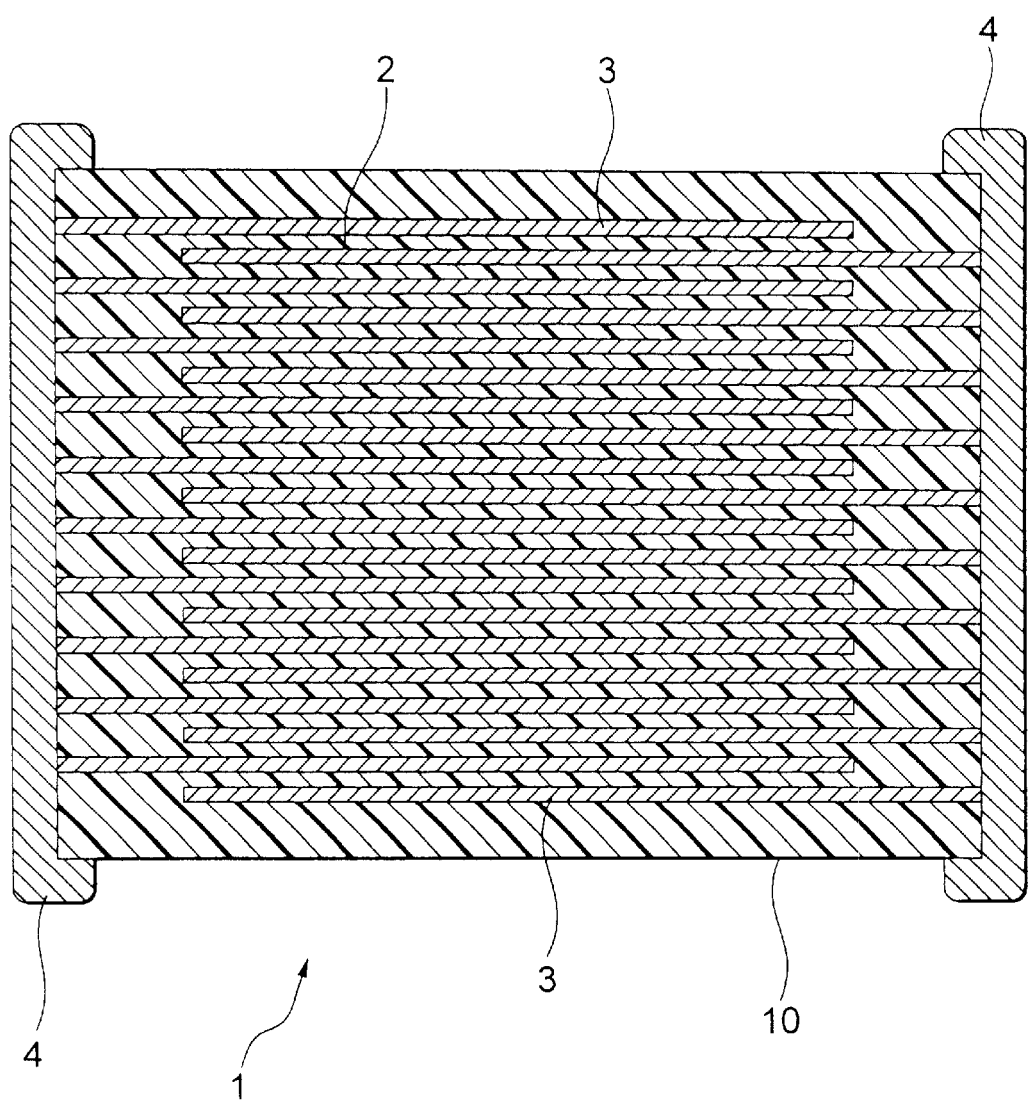
FIG. 1 is a sectional view of an multi-layer ceramic capacitor according to an embodiment of the present invention.

As shown in FIG. 1, the multi-layer ceramic capacitor according to one embodiment of the present invention, has a capacitor device body (10) of a configuration of dielectric layers (2) and internal electrode layers (3) layered alternately.

At the two ends of the capacitor device body (10) are a pair of external electrodes (4) being conductive with the internal electrode layers (3) alternately arranged inside the device body (10). The capacitor device body (10) is not limited to one particular shape, but is normally made in a parallelepiped shape. Further, the capacitor dimensions are not limited and may be made with suitable dimensions for with the application. Usually, however, the dimensions are (0.6 to 5.6 mm)×(0.3 to 5.0 mm)×(0.3 to 1.9 mm).

The internal electrode layers (3) are stacked so that the end faces thereof alternately protrude out to the surfaces of the two opposing ends of the capacitor device body (10). The pair of external electrodes (4) are formed at the two ends of the capacitor device body (10) and are connected to the exposed end faces of the alternately arranged internal electrode layers (3) so as to compose the capacitor circuit.

The dielectric layer (2) contains a dielectric ceramic composition of the present invention.

A dielectric ceramic composition of the present invention is comprised of:

a main component of $BaTiO_3$, a first subcomponent including at least one compound selected from MgO, CaO, BaO, SrO and $Cr_2O_3$, a second subcomponent containing silicone oxide as a main component, a third subcomponent including at least one compound selected from $V_2O_5$, $MoO_3$, and $WO_3$, a fourth subcomponent including an oxide of R1 (where R1 is at least one element selected from Sc, Er, Tm, Yb, and Lu), and a fifth subcomponent including $CaZrO_3$ or $CaO+ZrO_2$.

The ratios of the above subcomponents with respect to 100 moles of the main component of $BaTiO_3$ are:

first subcomponent: 0.1 to 3 moles,
second subcomponent: 2 to 10 moles,
third subcomponent: 0.01 to 0.5 moles,
fourth subcomponent: 0.5 to 7 moles, and
fifth subcomponent: 0<fifth subcomponent≦5 moles, and preferably,
first subcomponent: 0.5 to 2.5 moles,
second subcomponent: 2.0 to 5.0 moles,
third subcomponent: 0.1 to 0.4 moles,
fourth subcomponent: 0.5 to 5.0 moles, and
fifth subcomponent: 0.5 to 3 moles.

Figure 2:
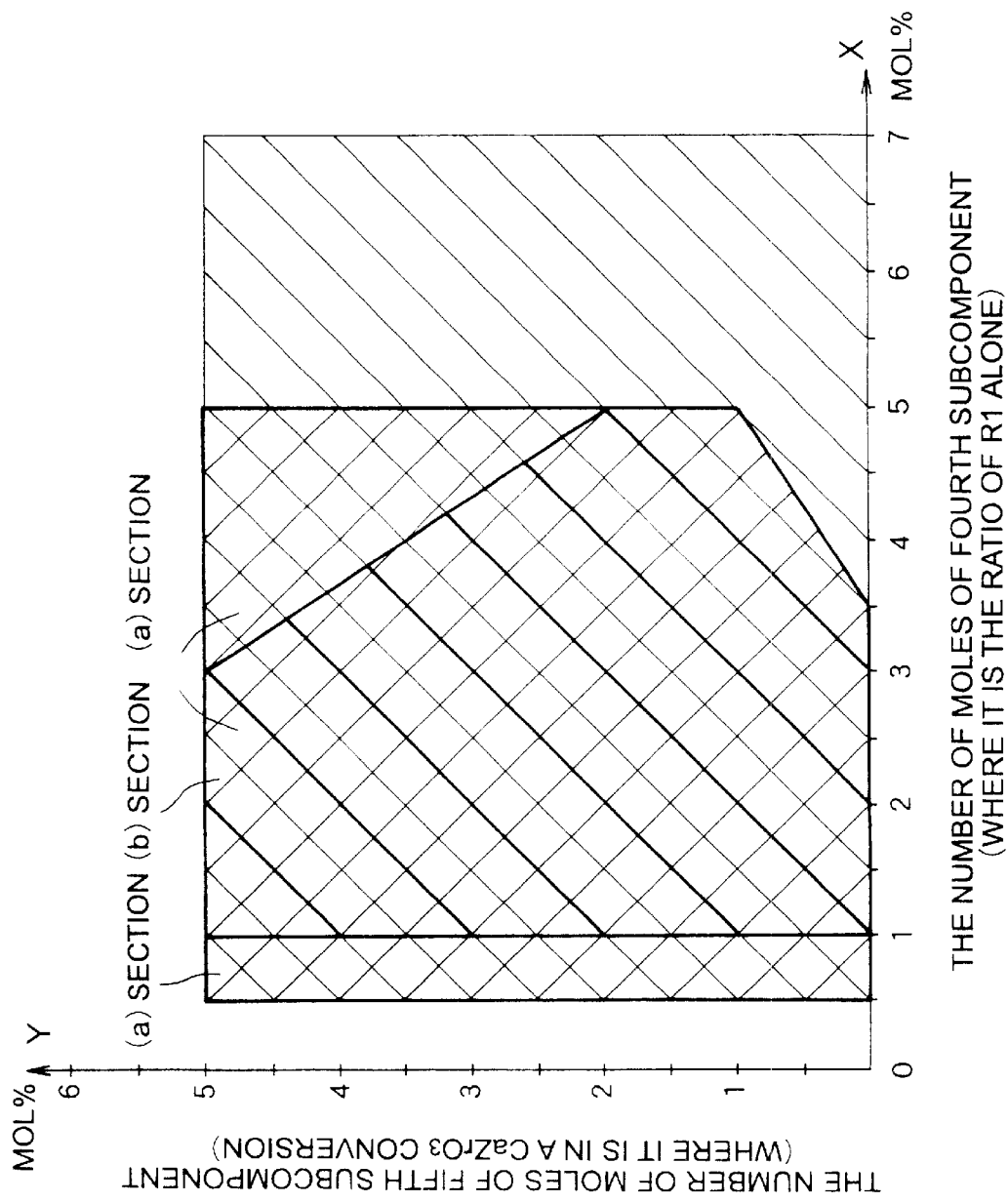
FIG. 2 is a view of the relationship of a preferable amount of the fourth subcomponent and the fifth subcomponent in a dielectric ceramic composition of the related art.

Preferably, when the number of moles of the fourth subcomponent and fifth subcomponent with respect to 100 moles of $BaTiO_3$ as a main component (where the number of moles of the fourth subcomponent is a ratio of R1 alone) are expressed by X and Y coordinates, the number of moles of the fourth subcomponent and fifth subcomponent are inside a range surrounded by straight lines of Y=5, Y=0, Y=(2/3)X−(7/3), X=0.5 and X=5 (where a boundary of Y=0 is not included, and an (a) section portion and boundaries other than Y=0 in FIG. 2 are included).

Also preferably, when the number of moles of the fourth subcomponent and fifth subcomponent with respect to 100 moles of $BaTiO_3$ as a main component (where the number of moles of the fourth subcomponent is a ratio of R1 alone) are expressed by an X and Y coordinates, the number of moles of the fourth subcomponent and fifth subcomponent are inside a range surrounded by straight lines of Y=5, Y=0, Y=(2/3)X−(7/3), Y=−(1.5)X+9.5, X=1 and X=5 (where a boundary of Y=0 is not included, and a (b) section portion and boundaries other than Y=0 in FIG. 2 are included).

Note that the above ratio of the fourth subcomponent is not the molar ratio of the R1 oxide, but the molar ratio of R1 alone. That is when, for example, using an oxide of Yb as the fourth subcomponent, a ratio of the fourth subcomponent of 1 mole does not mean the ratio of the $Yb_2O_3$ is 1 mole, but the ratio of Yb is 1 mole.

In this specification, the oxides constituting the main component and the subcomponents are expressed by stoichiochemical compositions, but the oxidized state of the oxides may also deviate from the stoichiochemical compositions. The ratios of the subcomponents, however, are found by a conversion from the amounts of the metals contained in the oxides constituting the subcomponents to the oxides of the above stoichiochemical compositions.

The reasons for limiting the amounts of the above subcomponents are as follows.

If the amount of the first subcomponent (MgO, CaO, BaO, SrO, and $Cr_2O_3$) is too small, the rate of change of the capacity-temperature characteristic ends up becoming too large. On the other hand, if the amount is too large, the sinterability deteriorates. Note that the ratios of the oxides in the first subcomponent may be any ratios.

If the amount of the second subcomponent (containing silicone oxide as a main component) is too small, the capacity-temperature characteristic becomes poor and the IR (specific insulation resistance) falls. On the other hand, if the amount is too large, the IR lifetime becomes insufficient and the dielectric constant ends up falling rapidly.

Preferably, the second subcomponent is indicated by at least one selected from $SiO_2$, MO (note that M is at least one element selected from Ba, Ca, Sr and Mg), $Li_2O$ and $B_2O_3$. The second subcomponent acts mainly as a sintering promoting agent and has the effect of improving the error rate of initial insulation resistance in the case of thin films.

More preferably, the second subcomponent is indicated by $(Ba, Ca)_xSiO_{2+x}$ (note x=0.7 to 1.2). The BaO and the CaO in the second subcomponent [$(Ba, Ca)_xSiO_{2+x}$] are also contained in the first subcomponent, but the composite oxide $(Ba, Ca)_xSiO_{2+x}$ has a low melting point, so it has good reactivity with the main component. Therefore, in the present invention, the BaO and/or CaO are also added as the above composite oxide. The x in the $(Ba, Ca)_xSiO_{2+x}$ as a more preferable state of the second subcomponent is preferably 0.8 to 1.2, more preferably 0.9 to 1.1. If x is too small, that is, if the $SiO_2$ is too large, the main component of $BaTiO_3$ will be reacted and the dielectric property will be deteriorated. On the other hand, if x is too large, the melting point will become high and the sinterability will deteriorate, so this is not preferable. Note that the ratio of Ba and Ca in the second subcomponent may be any and a subcomponent containing just one is also possible.

The third subcomponent ($V_2O_5$, $MoO_3$, and $WO_3$) exhibits the effect of smoothing the capacity-temperature characteristic higher than the Curie temperature and has the effect of improving the IR lifetime. If the amount of the third subcomponent is too small, the effect becomes insufficient. On the other hand, if the amount is too large, the IR falls remarkably. Note that the ratio of the oxides in the third subcomponent may be any.

The fourth subcomponent (R1 oxide) exhibits the effect of shifting the Curie temperature to the high temperature side and has the effect of smoothing the capacity-temperature characteristic. If the amount of the fourth subcomponent is too small, these effects become insufficient and the capacity-temperature characteristic is deteriorated. On the other hand, if the amount is too large, the sinterability tends to deteriorate. Among the fourth subcomponents, Yb oxide is preferred since it has a large effect on improvement of the characteristic and is also inexpensive.

The fifth subcomponent ($CaZrO_3$) displays the effect of shifting the Curie temperature to the higher temperature side and has the effect of making the capacity-temperature characteristics flat. Also, there is the effect of improving the CR product and direct-current insulation break down strength. Note that if the amount of the fifth subcomponent is too much, the IR accelerating lifetime remarkably deteriorates and the capacity-temperature characteristics (X8R characteristics) deteriorate. The adding form of $CaZrO_3$ is not limited specifically and oxides comprised of Ca, such as CaO, a carbonate like $CaCO_3$, organic composite, $CaZrO_3$, etc. can be raised. The ratio of Ca and Zr is not limited specifically and may be determined to the extent that $BaTiO_3$ as a main component is not made to be a solid solution, but the mole ratio of Ca with respect to Zr (Ca/Zr) is preferably 0.5 to 1.5, more preferably, 0.8 to 1.5, and further preferably, 0.9 to 1.1.

By adjusting the amounts of the fourth subcomponent (oxide of R1) and the fifth subcomponent ($CaZrO_3$), the capacity-temperature characteristics (X8R characteristics) can be made flat, and a high temperature accelerating lifetime and CR product can be improved. Particularly, in the above value range, deposit of different phases can be prevented and the texture can be unified. When the amount of the fourth subcomponent is too much, it is possible that a pyrochlore phase of huge needle-shaped crystalline may be deposited and tremendous deterioration of characteristics (decrease of CR product) is observed when the thickness between dielectric layers of a multi-layer ceramic capacitor is made thinner. On the other hand, when the amount of the fourth subcomponent is too small, the capacity-temperature characteristics cannot be satisfied. When the amount of the fifth subcomponent is too small, the CR product and the direct-current break down voltage VB are improved while the capacity-temperature characteristics decline and the IR acceleration lifetime also declines.

A dielectric ceramic composition of the present invention preferably includes an oxide of R2 (note that R2 is at least one element selected from Y, Dy, Ho, Tb, Gd and Eu) for 9 moles or less (more preferably, 0.5 to 9 moles) as a sixth subcomponent. The sixth subcomponent (an oxide of R2) displays the effect of improving the IR and IR lifetime and has little adverse effect on the capacity-temperature characteristics. Note that if the amount of the R2 oxide is too large, however, the sinterability tends to deteriorate. Among the fifth subcomponents, Y oxide is preferred since it has a large effect on improving the characteristic and is also inexpensive.

The total amount of the fourth subcomponent and the sixth subcomponent with respect to 100 moles of the main component of $BaTiO_3$ is preferably not more than 13 moles, and more preferably, not more than 10 moles (note that the numbers of moles of the fourth subcomponent and the sixth subcomponent are ratios of R1 and R2 alone). This is to maintain the preferable sinterability.

Further, the dielectric ceramic composition of the present invention may contain, as a seventh subcomponent, MnO. This seventh subcomponent exhibits the effect of promoting sintering, the effect of increasing the IR and the effect of improving the IR lifetime. To sufficiently obtain these effects, the ratio of the seventh subcomponent with respect to 100 moles of the $BaTiO_3$ is preferably at least 0.01 mole. If the amount of the seventh subcomponent is too large, there is an adverse effect on the capacity-temperature characteristic, so the amount is preferably not more than 0.5 mole.

Further, the dielectric ceramic composition of the present invention may also contain $Al_2O_3$ in addition to the above oxides. $Al_2O_3$ does not have much of an effect on the capacity-temperature characteristic and exhibits the effect of improving sinterability, the IR and the IR lifetime. If the amount of the $Al_2O_3$ is too large, however, the sinterability deteriorates and the IR falls, so the $Al_2O_3$ is preferably included in an amount of not more than 1 mole with respect to 100 moles of the $BaTiO_3$, and more preferably not more than 1 mole in the dielectric ceramic composition as a whole.

Note that when at least one element among Sr, Zr, and Sn replaces the Ba or Ti in the main component constituting the perovskite structure, the Curie temperature shifts to the low temperature side, so the capacity-temperature characteristic above 125° C. deteriorates. Therefore, it is preferable not to use a $BaTiO_3$ containing these elements [for example, (Ba, Sr)$TiO_3$] as a main component. There arises, however, no particular problem by a level included as an impurity (less than 0.1 mol % of the dielectric ceramic composition as a whole).

The average grain size of the dielectric ceramic composition of the present invention is not limited and may be determined in accordance with the thickness of the dielectric layers etc. from a range, for example, of 0.1 to 3.0 $\mu$m. There is a trend that the thinner the dielectric layers are and the smaller the average grain is in size, the more the capacity-temperature characteristic deteriorates. Therefore, the dielectric ceramic composition of the present invention is particularly effective when the average grain size has to be made small, specifically, when the average grain size is 0.1 to 0.5 $\mu$m. Further, if the average grain size small, the IR lifetime becomes longer and the change in the capacity under a direct current electric field over time becomes smaller. Therefore, it is even more preferable that the average grain size is made small for the above reason.

The Curie temperature of the dielectric ceramic composition of the present invention (phase transition temperature from strong dielectric to ordinary dielectric) may be changed by selecting the composition, but in order to satisfy the X8R characteristic, it is preferably at least 120° C., more preferably at least 123° C. Note that the Curie temperature may be measured using a DSC (differential scan calorimetry), etc.

The thickness of the dielectric layers comprised of the dielectric ceramic composition of the present invention is normally not more than 40 $\mu$m, particularly not more than 30 $\mu$m, per layer. The lower limit of the thickness is normally about 2 $\mu$m. The dielectric ceramic composition of the present invention is effective for the improvement of the capacity-temperature characteristic of a multi-layer ceramic capacitor having such thinned dielectric layers. Note that the number of the stacked dielectric layers is normally around 2 to 300.

The multi-layer ceramic capacitor using the dielectric ceramic composition of the present invention is suitable for use as an electronic device for equipment used at over 80° C., in particular in an environment of 125 to 150° C. Further, in this temperature range, the temperature characteristic of the capacity satisfies the R characteristic of the EIA standard and also satisfies the X8R characteristic. It is also possible to simultaneously satisfy the B characteristic of the EIAJ standard [rate of change of capacity of within ±10% at −25 to 85° C. (reference temperature 20° C.)] and the X7R characteristic of the EIA standard (−55 to 125° C., ΔC=±15% or less).

In a multi-layer ceramic capacitor, the dielectric layers are normally subjected to an alternating current electric field of from $0.02V/\mu m$, in particular from $0.2V/\mu m$, further from $0.5V/\mu m$, to generally not more than $5V/\mu m$ and a direct current electric field of not more than $5V/\mu m$ superposed over this, but the temperature characteristic of the capacity is extremely stable even when such electric fields are applied.

The dielectric ceramic composition of the present invention is a dielectric ceramic composition containing as the main component $BaTiO_3$, and includes components fulfilling conditions described below in an X-ray diffraction using a Cu—Kα ray.

The first condition is that a peak of a (002) crystal surface and a peak of a (200) crystal surface are overlapped and a pseudo cubic peak is observed in the range of $2\theta=44$ to $46°$, the half-width of the pseudo cubic peak is $0.3°$ or more at room temperature, and when the supposed intensity of the peak of the (002) crystal surface is I(002) and the intensity of the peak of the (200) crystal surface is I(200), $I(002) \geq I(200)$. The pseudo cubic peak here means a peak where the difference of a lattice constant between the peak of the (002) crystal surface and the peak of the (200) crystal surface disappears and separation by an X-ray diffraction analysis becomes difficult.

By satisfying these conditions, the capacity-temperature characteristics can be improved and the X8R characteristics can be satisfied.

Note that the measurement conditions at the X-ray diffraction are not specifically limited, but measurement conditions of a scan width of $0.05°$ or less and a scan speed of $0.1°/$minute or less, and as X-ray detection conditions, a parallel slit of $1°$ or less, an emission slit of $1°$ or less, and a light receiving slit of 0.3 mm or less may usually be used so as to obtain resolution to an extent that the half-width above can be confirmed.

A dielectric ceramic composition containing the first to fifth subcomponents above as essential components is capable of fulfilling the above conditions in the X-ray diffraction, but a dielectric ceramic composition having other compositions is also capable of fulfilling the above conditions in the X-ray diffraction by appropriately controlling the composition and the production conditions.

Also, the present invention includes dielectric ceramic compositions containing as the main component $BaTiO_3$, which exhibits the characteristics below in the differential scan calorimetry (DSC). The DSC is a measuring method for obtaining relationship of temperature and heat flow difference per unit time (dq/dt) which is used for measuring the Curie temperature, etc. The value of differentiating the heat flow difference with the temperature (hereinafter, referred to as DDSC) becomes 0 in the Curie temperature. When expressing the relationship of the temperature and the DDSC in a graph, a plus peak of DDSC exists on the lower temperature side and a minus peak of DDSC exists on the higher temperature side thereby sandwiching the Curie temperature. A dielectric ceramic composition where the distance (a temperature difference) between the pair of peaks is not less than $4.1°$ C., preferably, not less than $6°$ C. has preferable temperature characteristics of capacity and is able to fulfill the X8R characteristics.

A dielectric ceramic composition containing the above first to fifth subcomponents as essential components is capable of fulfilling the above characteristics in the DSC, however, a dielectric ceramic composition having other compositions is also capable of fulfilling the above conditions in the DSC by appropriately controlling the composition and the production conditions.

Also, the present invention includes dielectric ceramic compositions containing as the main component $BaTiO_3$, which exhibits the characteristics below in the Raman spectrum method.

The first condition is, when measuring by changing the sample temperature and supposing that a Raman peak intensity at $270$ cm$^{-1}$ being $I_{1270}$ and that at $310$ cm$^{-1}$ being $I_{310}$ at the sample temperature of $130°$ C., $0.1 \leq (I_{310}/I_{270})$ stands.

The second condition is, when measuring by changing the sample temperature, a half width value of the Raman peak at $535$ cm$^{-1}$ at the sample temperature of $130°$ C. is not more than $95$ cm$^{-1}$.

By fulfilling the above conditions, the capacity-temperature characteristics are improved and the X8R characteristics can be satisfied.

Note that measurement conditions of the Raman spectrum method are not specifically limited as far as being able to obtain a resolution so that the above half-width can be confirmed.

A dielectric ceramic composition containing the above first to fifth subcomponents as essential components is capable of fulfilling the above characteristics in the Raman method, however, a dielectric ceramic composition having other compositions is also capable of fulfilling the above conditions in the Raman method by appropriately controlling the composition and the production conditions.

The electroconductive material contained in the internal electrode layers (3) is not particularly limited, but a base metal may be used since the material constituting the dielectric layers (2) has a resistance to reduction. For the base metal used as the electroconductive material, Ni or an Ni alloy is preferable. For the Ni alloy, an alloy of at least one type of element selected from Mn, Cr, Co, and Al with Ni is preferable. The amount of the Ni in the alloy is preferably not less than 95 wt %.

Note that the Ni or Ni alloy may contain P and other various types of trace components in amounts of not more than 0.1 wt % or so.

The thickness of the internal electrode layer may be suitably determined in accordance with the application etc., but is usually 0.5 to 5 $\mu m$, in particular 0.5 to 2.5 $\mu m$.

The electroconductive material contained in the external electrodes (4) is not particularly limited, but in the present invention an inexpensive Ni, Cu, or alloys of the same may be used.

The thickness of the external electrodes may be suitably determined in accordance with the application etc., but is usually around 10 to 50 $\mu m$.

Method of Manufacturing Multi-Layer Ceramic Capacitor

The multi-layer ceramic capacitor using the dielectric ceramic composition of the present invention, like the conventional multi-layer ceramic capacitor, is produced by preparing a green chip using the usual printing method or sheet method which uses pastes, firing the green chip, then printing or transferring and firing the external electrodes. The method of manufacture will be explained in detail below.

The dielectric layer paste may be an organic-based paint comprised of a mixture of a dielectric ingredient and an organic vehicle and may also be a water-based paint.

For the dielectric ingredient, use may be made of the above-mentioned oxides or mixtures thereof or composite oxides, but it is also possible to use one selected from various compounds or mixtures becoming the above oxides or composite oxides after firing, such as carbonates, oxalates, nitrates, hydroxides and organic metal compounds. The amount quantity of the compounds in the dielectric ingredient may be suitably determined so as to give the above-mentioned composition of the dielectric ceramic composition after firing.

The dielectric ingredient is normally used as a powder of an average particle size of 0.1 to 3 $\mu$m.

The organic vehicle is comprised of a binder dissolved in an organic solvent. The binder used for the organic vehicle is not particularly limited, but may be suitably selected from ethyl cellulose, polyvinyl butyral, and other ordinary types of binders. Further, the organic solvent used is also not particularly limited and may be suitably selected from terpineol, butyl carbitol, acetone, toluene and other organic solvents in accordance with the printing method, sheet method, or other methods of use.

Further, when using a water-based paint as the dielectric layer paste, it is sufficient to knead a water-based vehicle comprised of a water-based binder or dispersant, etc. dissolved in water together with the dielectric layer ingredient. The water-based binder used for the water-based vehicle is not particularly limited. For example, a polyvinyl alcohol, cellulose, water-based acrylic resin, etc. may be used.

The internal electrode layer paste is prepared by kneading the electroconductive material comprised of the above various types of electroconductive metals and alloys or various types of oxides becoming the above electroconductive materials after firing, an organic metal compound, resinate, etc. together with the above organic vehicle.

The external electrode paste may be prepared in the same way as the above internal electrode layer paste.

The amount of the organic vehicle in the above pastes is not particularly limited and may fall within the usual amount, for example, the binder may be contained in an amount of 1 to 5 wt % or so and the solvent 10 to 50 wt % or so. Further, the pastes may include, in accordance with need, various types of additives selected from dispersants, plasticizers, dielectrics, insulators, etc. The total amount of these is preferably not more than 10 wt %.

When using a printing method, the dielectric layer paste and the internal electrode layer paste are successively printed on the PET or other substrate. The result is then cut into a predetermined shape, afterwhich the pastes are peeled off from the substrate to form a green chip.

Further, when using a sheet method, a dielectric layer paste is used to form a green sheet, the internal electrode layer paste is printed on upper surface of this, afterwhich these are layered to form a green chip.

Before firing, the green chip is processed to remove the binder. This process for removing the binder may be performed under ordinary conditions, but when using Ni or a Ni alloy or other base metal for the electroconductive material of the internal electrode layer, this is preferably performed under conditions where the air atmosphere has a rate of temperature rise of 5 to 300° C./hour, in particular 10 to 100° C./hour, a holding temperature is 180 to 400° C., in particular 200 to 300° C. and a temperature holding time is 0.5 to 24 hours, in particular 5 to 20 hours.

The atmosphere when firing the green chip may be suitably determined in accordance with the type of electroconductive material in the internal electrode layer paste, but when using Ni or a Ni alloy or other base metal as the electroconductive material, the oxygen partial pressure in the firing atmosphere is preferably $10^{-8}$ to $10^{-15}$ atms. If the oxygen partial pressure is less than this range, the electroconductive material of the internal electrode layers becomes abnormally sintered and ends up breaking in the middle in some cases. Further, if the oxygen partial pressure exceeds the above range, the internal electrode layers tend to become oxidized.

Further, the holding temperature at the time of firing is preferably 1100 to 1400° C., more preferably 1200 to 1360° C., still more preferably 1200 to 1320° C. If the holding temperature is less than the above range, the densification becomes insufficient, while if over that range, there is a tendency toward breaking of the electrodes due to abnormal sintering of the internal electrode layers, deterioration of the capacity-temperature characteristic due to dispersion of the material comprising the internal electrode layers and reduction of the dielectric ceramic composition.

The various conditions other than the above conditions are that preferably the rate of temperature rise is 50 to 500° C./hour, in particular 200 to 300° C./hour, a temperature holding time is 0.5 to 8 hours, in particular 1 to 3 hours, the cooling rate is 50 to 500° C./hour, in particular 200 to 300° C./hour. Note that the firing atmosphere is preferably a reducing atmosphere. As the atmospheric gas, it is preferable to use for example, a wet mixed gas of $N_2$ and $H_2$.

When firing in a reducing atmosphere, the capacitor device body is preferably annealed. The annealing process is for re-oxidizing the dielectric layer. Since this enables the IR lifetime to be remarkably prolonged, reliability is improved.

The oxygen partial pressure in the annealing atmosphere is preferably not less than $10^{-9}$ atms, in particular $10^{-6}$ to $10^{-9}$ atms. If the oxygen partial pressure is less than the above range, re-oxidation of the dielectric layer is difficult, while if over that range, the internal electrode layers tend to become oxidized.

The holding temperature at the time of annealing is preferably not more than 1100° C., in particular 500 to 1100° C. If the holding temperature is less than the above range, oxidation of the dielectric layers becomes insufficient, so the IR tends to become low and the IR lifetime short. On the other hand, when the holding temperature exceeds the above range, not only do the internal electrode layers oxidize and the capacity fall, but also the internal electrode layers end up reacting with the dielectric material resulting in a tendency toward deterioration of the capacity-temperature characteristic, a fall in the IR and a fall in the IR lifetime. Note that the annealing may be comprised of only a temperature raising process and temperature reducing process. That is, the temperature holding time may also be zero. In this case, the holding temperature is synonymous with the maximum temperature.

The various conditions other than the above conditions in annealing are that the temperature holding time is preferably 0 to 20 hours, in particular 6 to 10 hours, the cooling rate is preferably 50 to 500° C./hour, in particular 100 to 300° C./hour. Note that for the atmospheric gas, wet $N_2$ gas, etc. may be used.

During the process for removing the binder, the firing, and the annealing, for example, a wetter, etc. may be used to wet the $N_2$ gas or mixed gas. In this case, the temperature of the water is preferably 5 to 75° C.

The process for removing the binder, firing, and annealing may be performed consecutively or independently. When preferably performing these consecutively, after processing to remove the binder, the atmosphere is changed without cooling, then the temperature is raised to the holding temperature for firing, the firing performed, then the chip is cooled, the atmosphere is changed when the holding temperature of the annealing is reached, and then annealing is performed. On the other hand, when performing these independently, as to firing, it is preferable that the temperature is raised to the holding temperature at the time of the process for removing the binder in an $N_2$ gas or wet $N_2$ gas atmosphere, then the atmosphere is changed and the temperature is further raised. Preferably, the chip is cooled to the holding temperature of the annealing, then the atmosphere is changed again to an $N_2$ gas or wet $N_2$ gas atmosphere and the cooling continued. Further, at the time of annealing, the temperature may be raised to the holding temperature in an $N_2$ gas atmosphere, afterwhich the atmosphere is changed or the entire annealing process may be performed in a wet $N_2$ gas atmosphere.

The thus obtained capacitor device body is, for example, end polished using barrel polishing or sandblasting etc., then printed or transferred with an external electrode paste and fired to form the external electrodes 4. The firing conditions of the external electrode paste are for example preferably 600 to 800° C. for 10 minutes to 1 hour or so in a wet mixed gas of $N_2$ and $H_2$. Further, in accordance with need, the surfaces of the external electrodes 4 may be formed with a covering layer using plating techniques, etc.

The thus produced multi-layer ceramic capacitor of the present invention is mounted by soldering it onto a printed circuit board for use in various types of electronic equipment.

Note that an embodiment of the present invention was explained above, however, the present invention is not limited to the above embodiments and may be modified in various ways within the scope of the invention.

For example, in the above embodiments, illustration was made of a multi-layer ceramic capacitor as the electronic device according to the present invention, but the electronic device according to the present invention is not limited to a multi-layer ceramic capacitor and may be any device having a dielectric layer comprised of a dielectric ceramic composition of the above composition.

Next, examples wherein the embodiment of the present invention is described more specifically and the present invention will be explained further in detail. Note that the present invention is not limited to the embodiments.

EXAMPLE 1

At first, as starting materials for preparing a dielectric substance, a main component material ($BaTiO_3$) and the first to seventh subcomponents respectively having an average particle diameter of 0.1 to 1 µm were prepared. Carbonate (the first subcomponent: $MgCO_3$, the seventh subcomponent: $MnCO_3$ was used for a material of $MgO$ and $MnO$, and oxides (the second subcomponent: $(Ba_{0.6} Ca_{0.4})SiO_3$, the third subcomponent: $V_2O_5$, the fourth subcomponent: $Yb_2O_3$, the fifth subcomponent: $CaZrO_3$, the sixth subcomponent: $Y_2O_3$) were used as other materials. Note that $(Ba_{0.6} Ca_{0.4})SiO_3$ as the second subcomponent was prepared by performing wet mixing using a ball mill for 16 hours on $BaCo_3$, $CaCO_3$ and $SiO_2$, drying, firing at 1150° C. in the air, and further performing wet grinding using a ball mill for 100 hours. While, $CaZrO_3$ as the fifth subcomponent was prepared by performing wet mixing using a ball mill for 16 hours on $CaCO_3$ and $ZrO_3$, drying, firing at 1150° C. in the air, and further performing wet grinding using a ball mill for 24 hours.

Note that the same characteristics were also obtained by using the main component $BaTiO_3$ prepared by respectively weighing $BaCO_3$ and $TiO_2$, performing wet mixing using a ball mill for 16 hours on $CaCO_3$ and $ZrO_3$, drying, firing at 1100° C. in the air, and further performing wet grinding using a ball mill for 16 hours. Also, the same characteristics were obtained by using the main component $BaTiO_3$ prepared using hydrothermal crystallization powder, an oxalate method, etc.

These materials were compounded so that the composition after firing becomes as shown in Table 1 below with respect to 100 moles of the main component $BaTiO_3$, subjected to wet mixing by using a ball mill for 16 hours and dried to be a dielectric substance.

TABLE 1

| | Main Component | Subcomponent | | | | | | | | |
|---|---|---|---|---|---|---|---|---|---|---|
| | | First | Second | Third | Fourth | | Fifth | Sixth | | Seventh |
| Sample Number | $BaTiO_3$ (moles) | $MgCO_3$ (moles) | $(Ba_{0.6}, Ca_{0.4})SiO_3$ (moles) | $V_2O_5$ (moles) | $Yb_2O_3$ (moles) | Yb Conversion (moles) | $CaZrO_3$ (moles) | $Y_2O_3$ (moles) | Y Conversion (moles) | $MnCO_3$ (moles) |
| 1* | 100 | 1 | 3 | 0.1 | 0 | 0 | 0 | 2 | 4 | 0.374 |
| 5 | 100 | 1 | 3 | 0.1 | 2.13 | 4.26 | 0 | 2 | 4 | 0.374 |
| 8 | 100 | 1 | 3 | 0.1 | 0.5 | 1 | 0.5 | 2 | 4 | 0.374 |
| 9 | 100 | 1 | 3 | 0.1 | 1.75 | 3.5 | 0.5 | 2 | 4 | 0.374 |
| 10 | 100 | 1 | 3 | 0.1 | 2.13 | 4.26 | 0.5 | 2 | 4 | 0.374 |
| 11 | 100 | 1 | 3 | 0.1 | 1 | 2 | 1 | 2 | 4 | 0.374 |
| 12 | 100 | 1 | 3 | 0.1 | 1.5 | 3 | 1 | 2 | 4 | 0.374 |
| 13 | 10Q | 1 | 3 | 0.1 | 1.75 | 3.5 | 1 | 2 | 4 | 0.374 |
| 14 | 100 | 1 | 3 | 0.1 | 2.13 | 4.26 | 1 | 2 | 4 | 0.374 |
| 15 | 100 | 1 | 3 | 0.1 | 1 | 2 | 1.5 | 2 | 4 | 0.374 |
| 16 | 100 | 1 | 3 | 0.1 | 1.5 | 3 | 1.5 | 2 | 4 | 0.374 |
| 17 | 100 | 1 | 3 | 0.1 | 1.75 | 3.5 | 1.5 | 2 | 4 | 0.374 |
| 18 | 100 | 1 | 3 | 0.1 | 2.13 | 4.26 | 1.5 | 2 | 4 | 0.374 |
| 19 | 100 | 1 | 3 | 0.1 | 2.5 | 5 | 1.5 | 2 | 4 | 0.374 |
| 20 | 100 | 1 | 3 | 0.1 | 1 | 2 | 2 | 2 | 4 | 0.374 |
| 21 | 100 | 1 | 3 | 0.1 | 1.5 | 3 | 2 | 2 | 4 | 0.374 |
| 22 | 100 | 1 | 3 | 0.1 | 1.75 | 3.5 | 2 | 2 | 4 | 0.374 |
| 23 | 100 | 1 | 3 | 0.1 | 2.13 | 4.26 | 2 | 2 | 4 | 0.374 |
| 24* | 100 | 1 | 3 | 0.1 | 0 | 0 | 3 | 2 | 4 | 0.374 |
| 25 | 100 | 1 | 3 | 0.1 | 1 | 2 | 3 | 2 | 4 | 0.374 |

TABLE 1-continued

| | Main Component | Subcomponent | | | | | | | |
|---|---|---|---|---|---|---|---|---|---|
| | | First | Second | Third | Fourth | | Fifth | Sixth | | Seventh |
| Sample Number | BaTiO$_3$ (moles) | MgCO$_3$ (moles) | (Ba$_{0.6}$, Ca$_{0.4}$)SiO$_3$ (moles) | V$_2$O$_5$ (moles) | Yb$_2$O$_3$ (moles) | Yb Conversion (moles) | CaZrO$_3$ (moles) | Y$_2$O$_3$ (moles) | Y Conversion (moles) | MnCO$_3$ (moles) |
| 26 | 100 | 1 | 3 | 0.1 | 1.5 | 3 | 3 | 2 | 4 | 0.374 |
| 27 | 100 | 1 | 3 | 0.1 | 1.75 | 3.5 | 3 | 2 | 4 | 0.374 |
| 28 | 100 | 1 | 3 | 0.1 | 2.13 | 4.26 | 3 | 2 | 4 | 0.374 |
| 29 | 100 | 1 | 3 | 0.1 | 3 | 6 | 3 | 2 | 4 | 0.374 |
| 30 | 100 | 1 | 3 | 0.1 | 1 | 2 | 4 | 2 | 4 | 0.374 |
| 31 | 100 | 1 | 3 | 0.1 | 1.5 | 3 | 4 | 2 | 4 | 0.374 |
| 32 | 100 | 1 | 3 | 0.1 | 1.75 | 3.5 | 4 | 2 | 4 | 0.374 |
| 33 | 100 | 1 | 3 | 0.1 | 2.13 | 4.26 | 4 | 2 | 4 | 0.374 |
| 34* | 100 | 1 | 3 | 0.1 | 0 | 0 | 5 | 2 | 4 | 0.374 |
| 35 | 100 | 1 | 3 | 0.1 | 0.5 | 1 | 5 | 2 | 4 | 0.374 |
| 36 | 100 | 1 | 3 | 0.1 | 1 | 2 | 5 | 2 | 4 | 0.374 |
| 37 | 100 | 1 | 3 | 0.1 | 1.5 | 3 | 5 | 2 | 4 | 0.374 |
| 38 | 100 | 1 | 3 | 0.1 | 1.75 | 3.5 | 5 | 2 | 4 | 0.374 |
| 39 | 100 | 1 | 3 | 0.1 | 2.13 | 4.26 | 5 | 2 | 4 | 0.374 |
| 40 | 100 | 1 | 3 | 0.1 | 2.5 | 5 | 5 | 2 | 4 | 0.374 |
| 41* | 100 | 1 | 3 | 0.1 | 2 | 4 | 6 | 2 | 4 | 0.374 |
| 42* | 100 | 1 | 3 | 0.1 | 2.13 | 4.26 | 6 | 2 | 4 | 0.374 |
| 43* | 100 | 1 | 3 | 0.1 | 3 | 6 | 6 | 2 | 4 | 0.374 |

Samples with "*" indicate comparative examples of the present invention.

A dielectric paste was prepared by mixing through use of a ball mill to make a paste 100 parts by weight of the thus obtained dried dielectric materials, 4.8 parts by weight of acrylic resin, 40 parts by weight of methylene chloride, 20 parts by weight of ethyl acetate, 6 parts by weight of mineral spirits and 4 parts by weight of acetone.

Then, an internal electrode paste was made by kneading using a triple-roll to make a paste 100 parts by weight of Ni particles of an average particle size of 0.2 to 0.8 μm, 40 parts by weight of an organic vehicle (8 parts by weight of an ethyl cellulose resin dissolved in 92 parts by weight of butyl carbitol), and 10 parts by weight of butyl carbitol.

An external electrode paste was prepared by kneading together to make a paste 100 parts by weight of Cu particles of an average particle size of 0.5 μm, 35 parts by weight of an organic vehicle (8 parts by weight of an ethyl cellulose resin dissolved in 92 parts by weight of butyl carbitol) and 7 parts by weight of butyl carbitol.

Next, the above dielectric layer paste was used to form a green sheet having a thickness of 15 μm on a PET film. An internal electrode paste was printed on this, then the sheet was peeled from the PET film. Next, the thus obtained green sheets and protection green sheet (on which the internal electrode layer paste is not printed) were layered, adhered by means of pressure to prepare a green chip. The number of layered layers of the green sheet having the internal electrode was four.

First, the green chip was cut to a predetermined size and was processed to remove the binder, fired, and annealed to obtain the multi-layer ceramic fired body. The process of removing the binder was performed under conditions where a time of temperature rise was 15° C./hour, a holding temperature was 280° C., a holding time was 8 hours and in the air atmosphere. Firing was performed under the conditions where the rate of temperature rise was 200° C./hour, a holding temperature was 1280 to 1320° C., a holding time was 2 hours, the rate of cooling was 300°, and in an atmosphere of wet mixed gas of N$_2$+H$_2$ (an oxygen partial pressure was 10$^{-9}$ atms. Annealing was performed under the conditions that a holding temperature was 900° C., a temperature holding time was 9 hours, and in a wet N$_2$ gas atmosphere (an oxygen partial pressure was 10$^{-5}$ atms). Note that a wetter having a water temperature of 35° C. was used for wetting the atmosphere gases at the time of firing and annealing.

The external electrodes were formed by polishing the end faces of the fired body by sandblasting, then transferring the external electrode paste to the end faces and firing them there in a wet N$_2$ +H$_2$ atmosphere at 800° C. for 10 minutes, so as to obtain a sample of a multi-layer ceramic capacitor having the configuration as shown in FIG. 1.

The size of the thus obtained respective samples was 3.2 mm ×1.6 mm ×0.6 mm, the number dielectric layers sandwiched by the internal electrode layers was 4 and the thickness thereof was 10 μm, and the thickness of the internal electrode layer was 2 μm.

Disk-shaped samples were prepared in addition to the samples of the capacitors. The disk-shaped samples have the same composition as that of the above capacitors, have the same firing conditions, and an In—Ga electrode having a diameter of 5 mm was applied on the both surfaces of the samples.

The characteristics below of the respective samples were evaluated.

Permittivity (∈r), Dielectric Loss (tanδ), Specific Insulation Resistance (IR), CR Product The capacitance and dielectric loss (unit of %) were measured by an LCR meter under conditions of a frequency of 1 kHz and an input signal level of 1 Vrms. Then, the permittivity (no unit) was calculated from the obtained capacitance, an electrode size and a distance between electrodes. A direct-current of 50V was applied for one minute at 25° C., the specific insulation resistance (IR, unit of Ωcm) at the time was measured using an insulator resistance meter (R8340A made by Advantest Co.), and a CR product was calculated. The CR product was indicated by a product of the capacitance (C, μF) with the specific insulation resistance (R, MΩ). The result is shown in Table 2.

Figure 3:
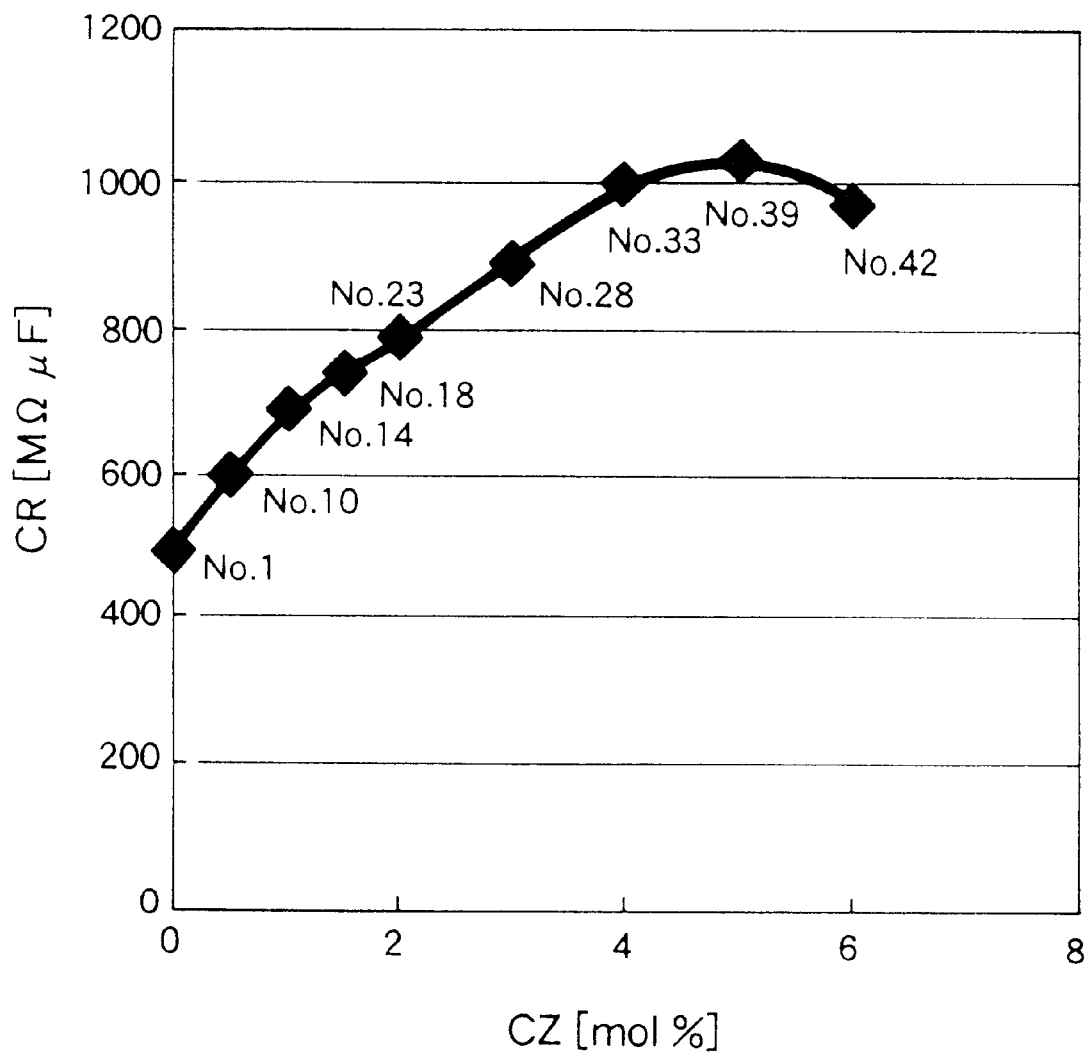
FIG. 3 is a graph of the relationship of an amount of CaZrO$_3$ and a CR product.

Note that the relationship of the CR product when an amount of CaZrO$_3$ is changed when using capacitor samples (samples 1, 10, 14, 18, 23, 28, 33, 39 and 42) is shown in FIG. 3.

Temperature Characteristics of Capacitance

The capacitor samples measured the capacitance within a temperature range of −55 to 160° C., and the change rate of the capacitances (ΔC) at −55° C., +125° C. and 150° C. with respect to the capacitance at +25° C. were calculated. The result is shown in Table 2. Also, whether the X8R characteristics (within −55 to 150° C. and ΔC=±15%) is satisfied or not was investigated, and those which fulfill the X8R characteristics are checked ○ and those which do not fulfill were checked × in Table 2.

Figure 4:
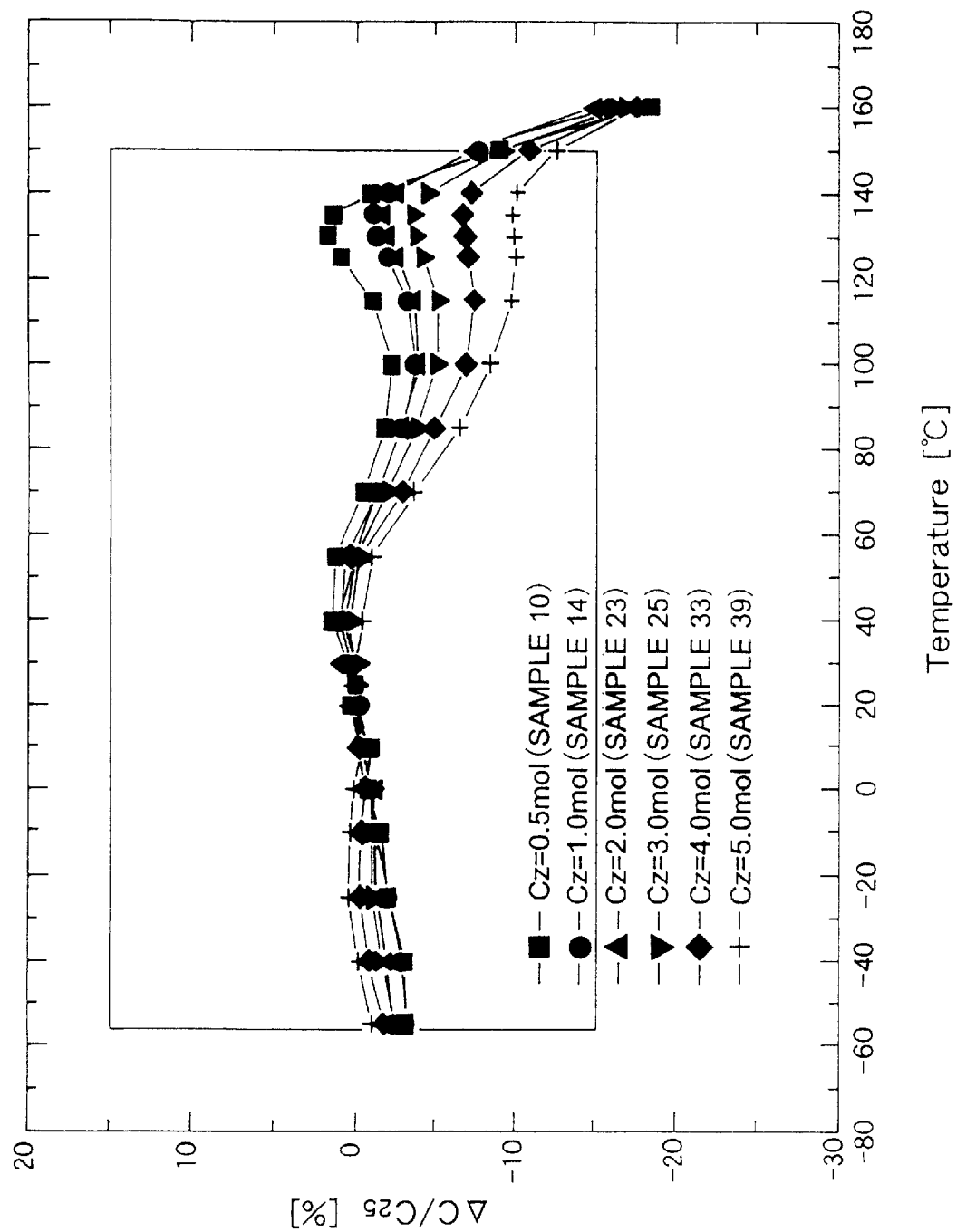
FIG. 4 is a graph of capacity-temperature characteristics of a capacitor.

Samples containing $CaZrO_3$ (Samples 10, 14, 23, 25, 33 and 39) in embodiments of the present invention were selected and the capacity temperature characteristics of −55° C. to 160° C. of those were shown in FIG. 4. A block range fulfilling the X8R characteristics is also shown in FIG. 4. Note that an LCR meter was used for measurement and the measurement voltage was set to be 1V.

Figure 5:
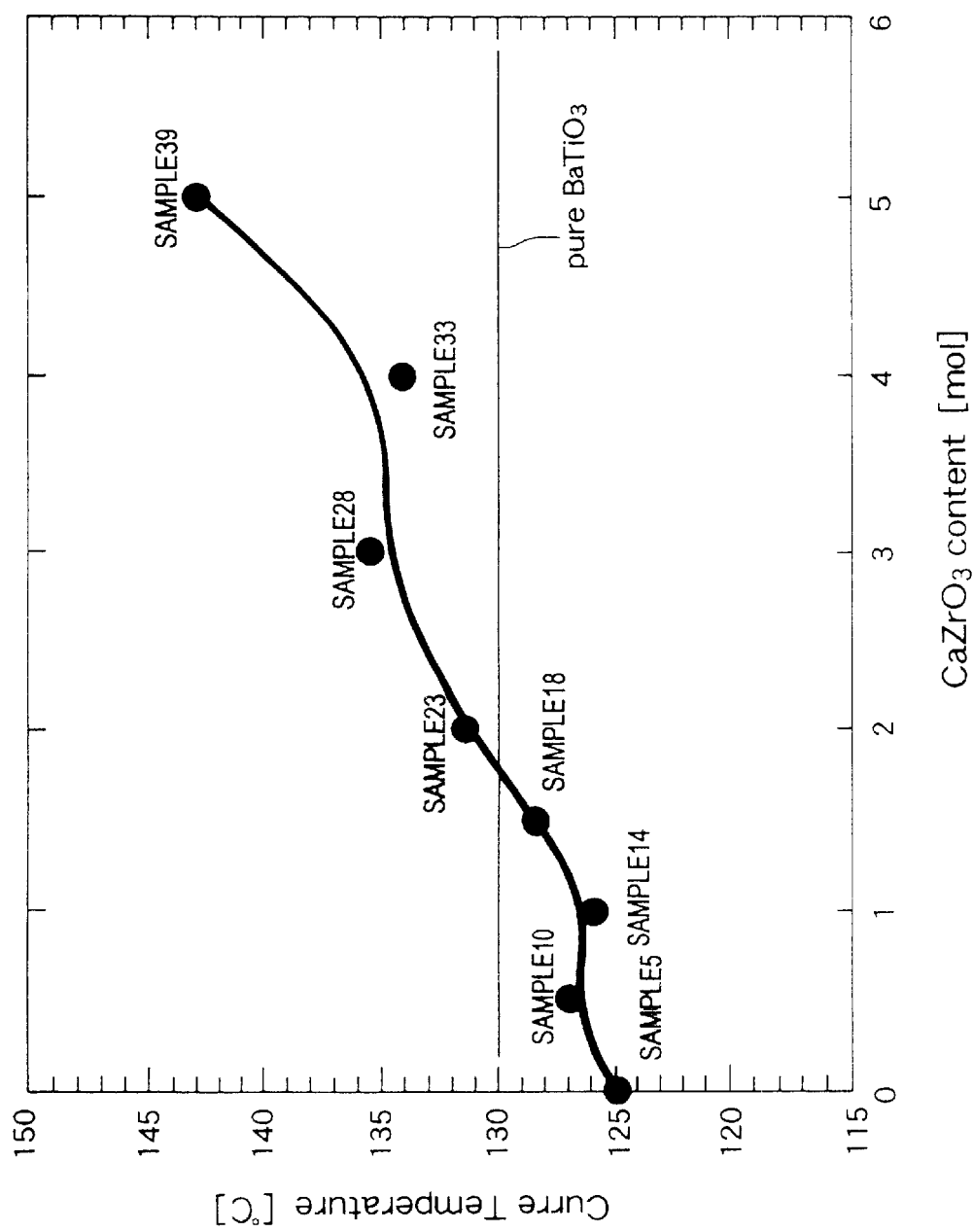
FIG. 5 is a graph of the relationship of an amount of CaZrO$_3$ and the Curie temperature.

Furthermore, capacitor samples (Samples 5, 10, 14, 18, 23, 28, 33 and 39) in embodiments of the present invention were selected and the relationship between the amount of $CaZrO_3$ and the Curie temperature (measured by DSC) thereof were shown in FIG. 5.

Specific Insulation Resistance (IR) Lifetime under Direct-Current Electric Field The capacitor samples were conduced under an acceleration test at 200° C. under the electric field of 15V/$\mu$m and time (unit is hours) until a specific insulation resistance (IR) of 1 MΩor less was calculated. The result is shown in Table 3.

To the capacitor samples were applied a direct current voltage at the rate of temperature rise of 100V/sec. Where the direct-current insulation break down strength was evaluated by detecting 100 mA of leak current or measuring a voltage when elements were damaged (a direct-current break down voltage, the unit is V).

X-ray Diffraction

Figure 6:
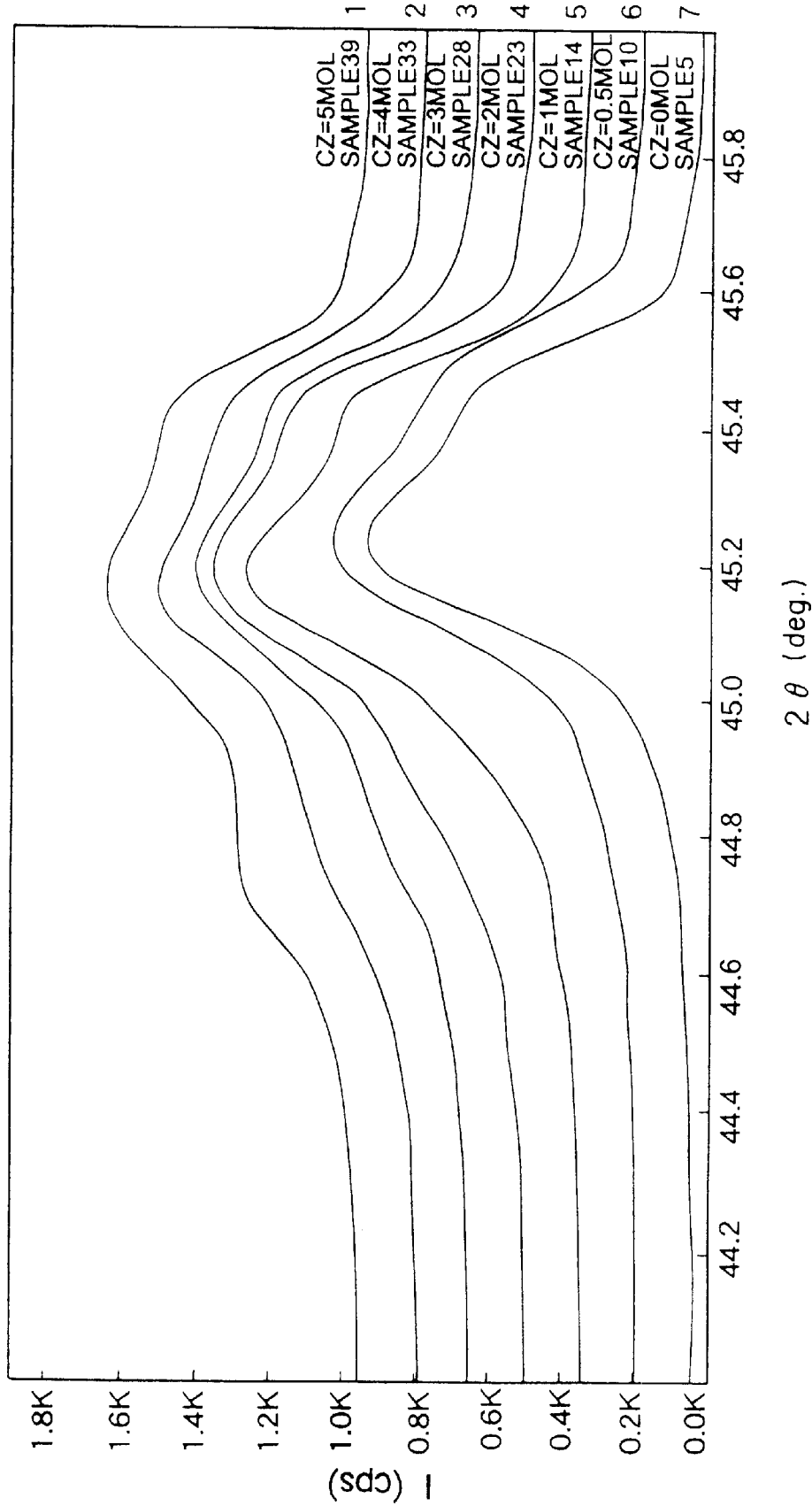
FIG. 6 is an X-ray diffraction chart in the range of 2θ=44 to 46° of a dielectric ceramic composition containing CaZrO$_3$.

The disk-shaped samples (Samples 5, 10, 14, 23, 28, 33 and 39) were measured a half-width of a pseudo cubic peak where a peak of a (002) crystal surface and a peak of a (200) crystal surface overlap by measuring the range of 2θ=44 to 46° C. by means of a powder X-ray (Cu—K$\alpha$) diffraction apparatus under the conditions of X-ray generation that are 40 kV–40 mA, a scan width of 0.01° and a scan speed of 0.05°/min. and conditions of X-ray detection where parallel slits are 0.5°, emission slits are 0.5° and light receiving slits are 0.15 mm. Those which have the half-width of 0.3° or more are checked ○, while those which have that of less than 0.30 are checked × in Table 3. Also, peak intensity I(002) of the (002) crystal surface and peak intensity I(200) of the (200) crystal surface were measured to investigate whether I(002)≧I(200) was fulfilled or not. Those which fulfilled were checked ○ and those which did not were checked × in Table 3. The measurements were made in room temperature (25° C.). An X-ray diffraction chart is shown in FIG. 6.

Figure 7:
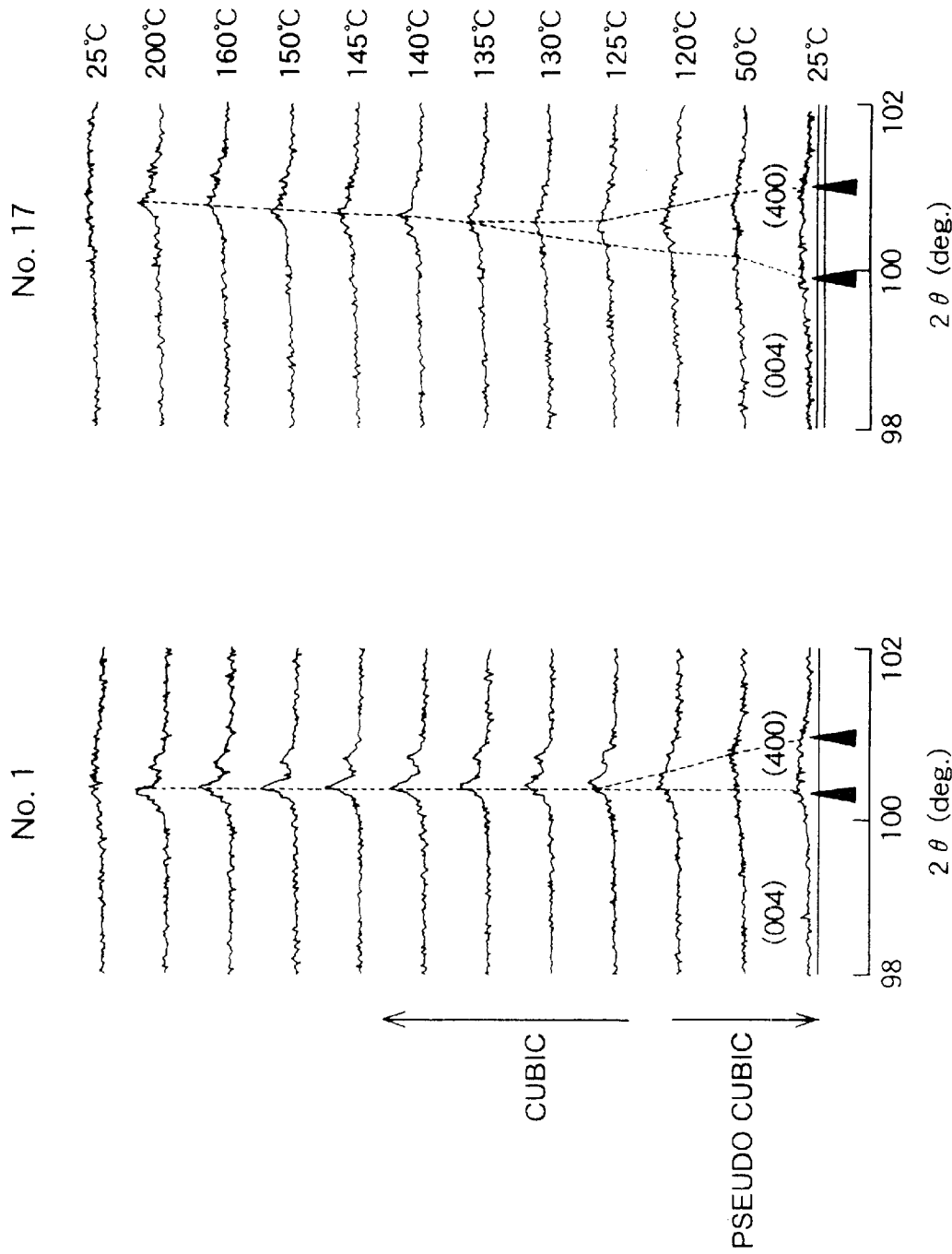
FIG. 7 is an X-ray diffraction chart in the range of 2θ=98 to 103° of Sample 1 not containing CaZrO$_3$ and Sample 17 containing CaZrO$_3$.

The disk-shaped samples (Samples 1 and 17) were measured within the range of 2θ=98 to 103° C. under the same conditions by means of the same apparatus the half-width of the pseudo cubic peak where a peak of a (004) crystal surface and a peak of a (400) crystal surface overlap. Those which have the half-width of 0.4° or more are checked ○, while those which have that of less than 0.4° are checked × in Table 3. The measurements were made in the range that the sample temperatures were 25 to 200° C. An X-ray diffraction chart is shown in FIG. 7 (wherein the vertical axis indicates intensity).

Note that, when obtaining the half-width, data were separated between those that were K$\alpha_1$ line and those that were K$\alpha_2$ line where the data of the K$\alpha_1$ was used.

DC Bias Characteristics (Direct-Current Application Dependency of Dielectric Constant)

Figure 8:
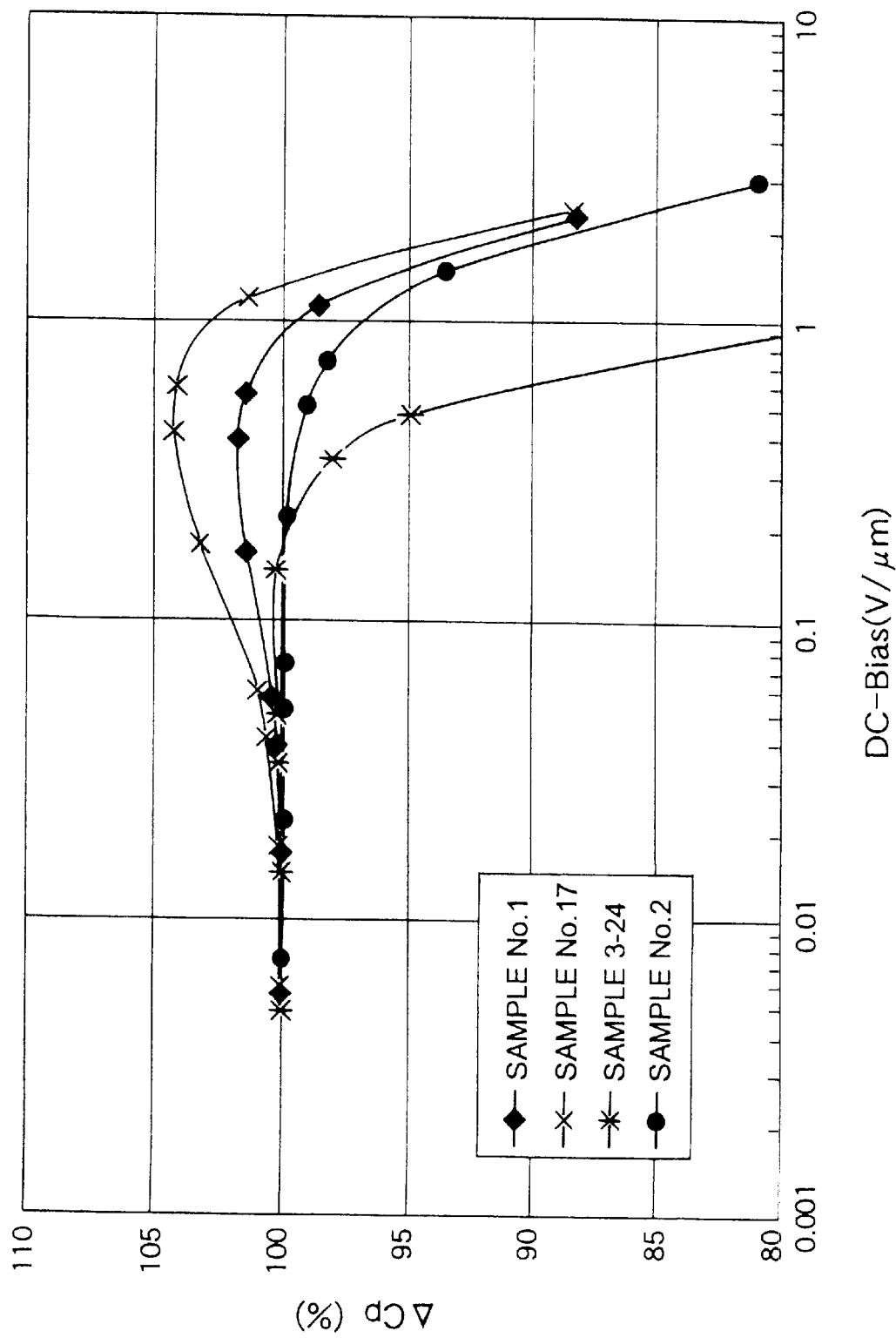
FIG. 8 is a graph of DA bias characteristics of a dielectric ceramic composition of the present invention.

The capacitor sample containing $CaZrO_3$ inside the range of the present invention (Sample 17) and the capacitor samples containing $CaZrO_3$ outside the composition range of the present invention (Samples 1, 2, 3 to 24) were used for measuring changes of capacitance (Δcp) where a direct-current voltage was gradually applied to the respective samples at a constant temperature (25° C.). The result is shown in FIG. 8.

Note that the composition of Sample 2 was $85BaTiO_3$+ $1Bi_2O_3$+$4.5Ta_2O_6$+$0.5MgO$+$1Cuo$+$1.5ZnO$+$2TiO_2$+ $1.5SnO_2$+$3Dy_2O_3$ and the composition of Samples 3 to 24 was $98BaTiO_3$+$2CaTiO_3$+$Nb_2O_5$(1 wt %)+ZnO(1 wt %)+MnO(1 wt %) +$SiO_2$(1 wt %).

Measurement by DSC

Figure 9:
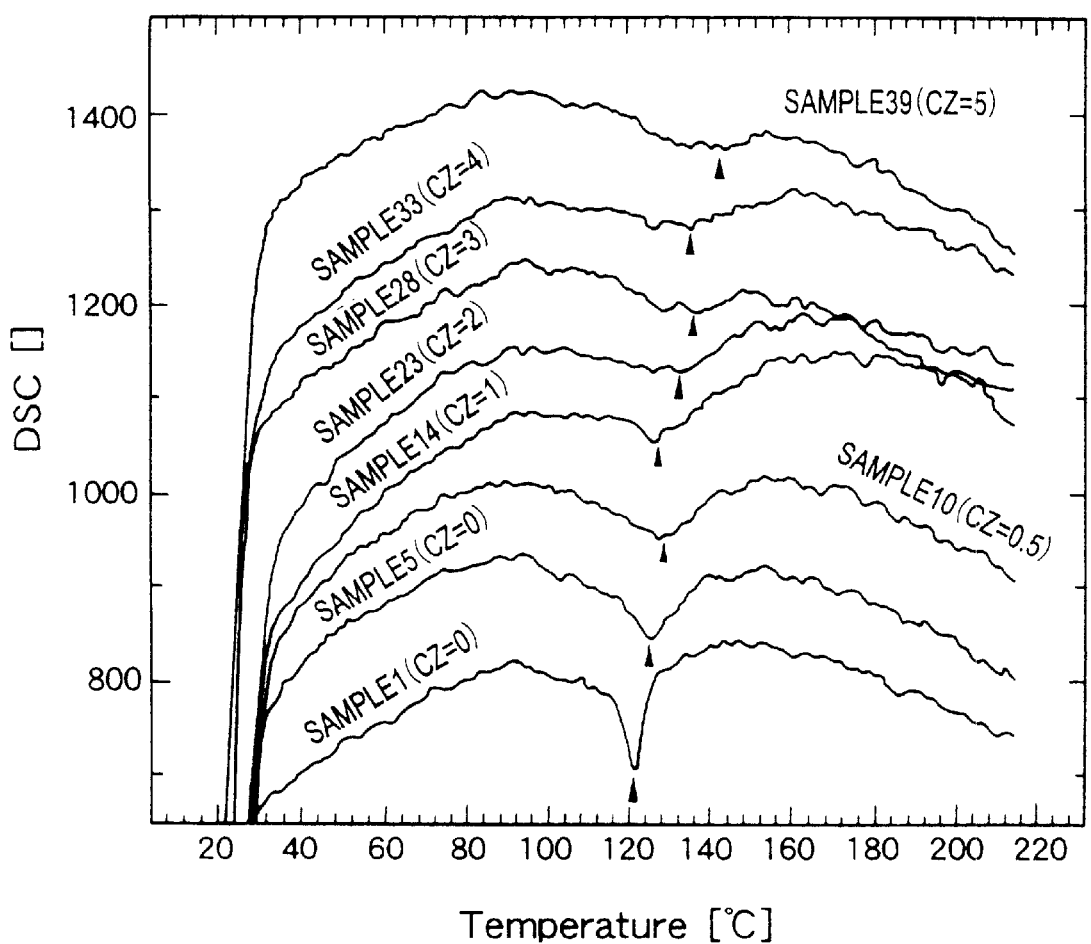
FIG. 9 is a graph of a temperature-DDSC curve of a dielectric ceramic composition wherein an amount of CaZrO$_3$ has been changed.
Figure 10:
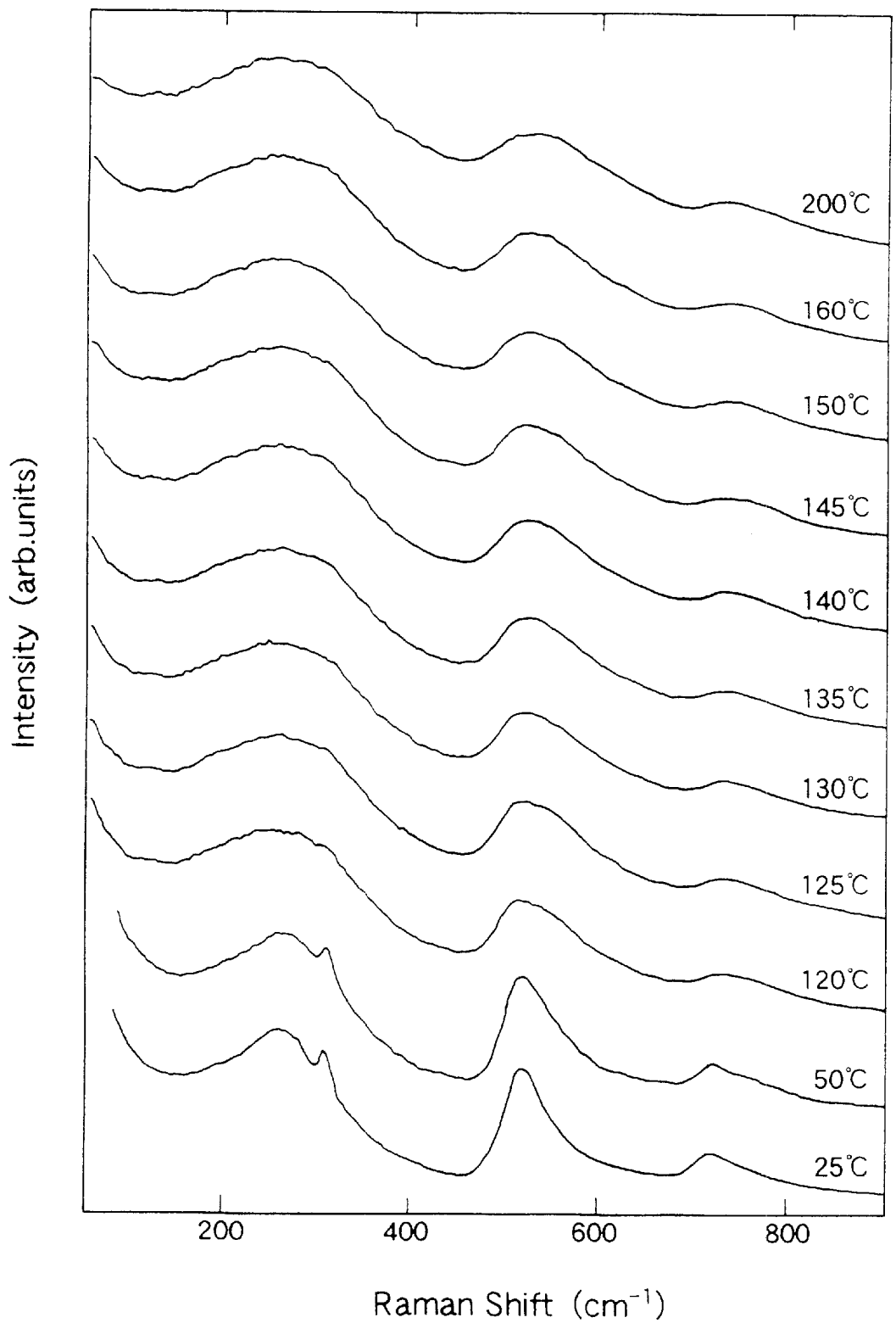
FIG. 10 is a graph of temperature changes of the Raman spectrum of a disk-shaped sample (Sample 1)
Figure 11:
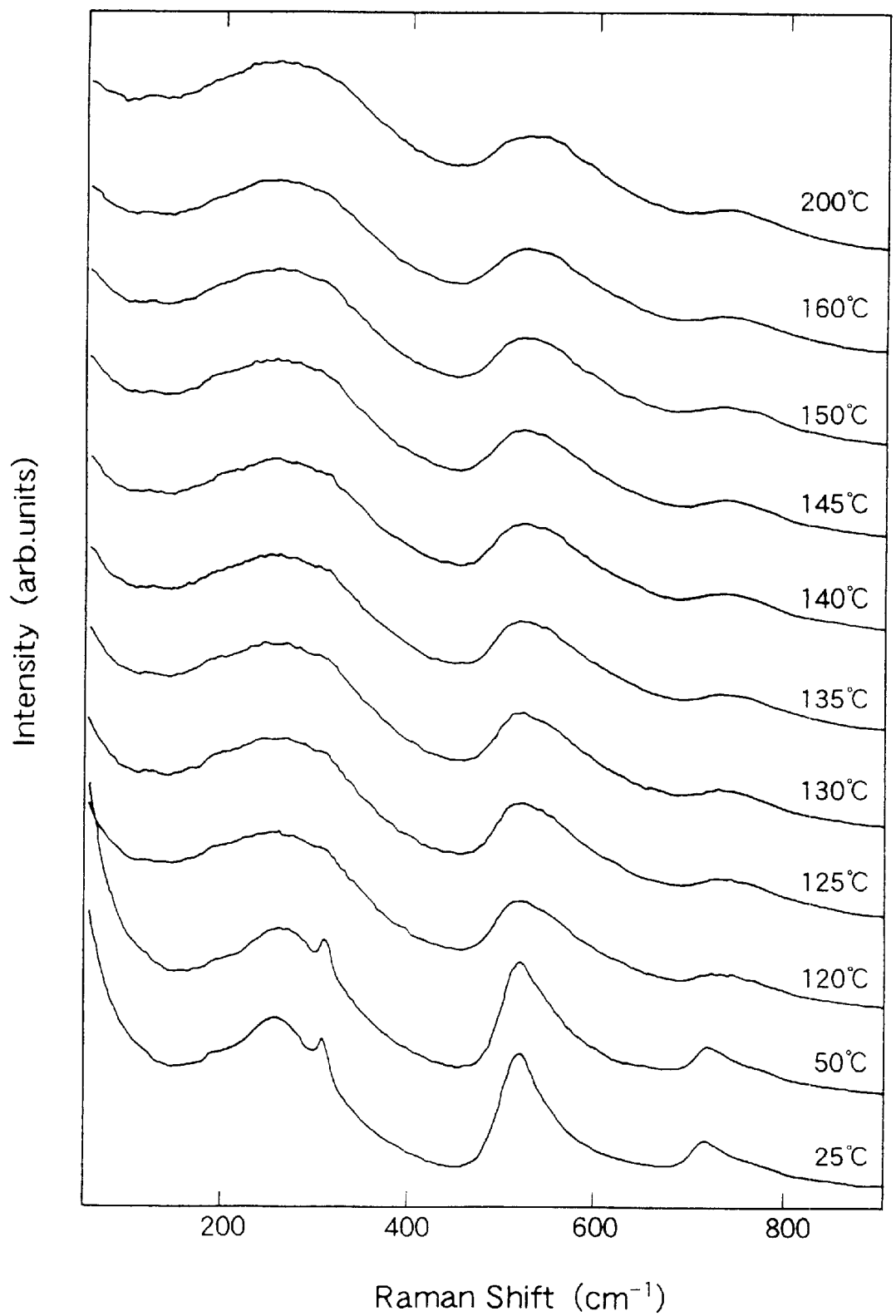
FIG. 11 is a graph of temperature changes of the Raman spectrum of a disk-shaped sample (Sample 5)
Figure 12:
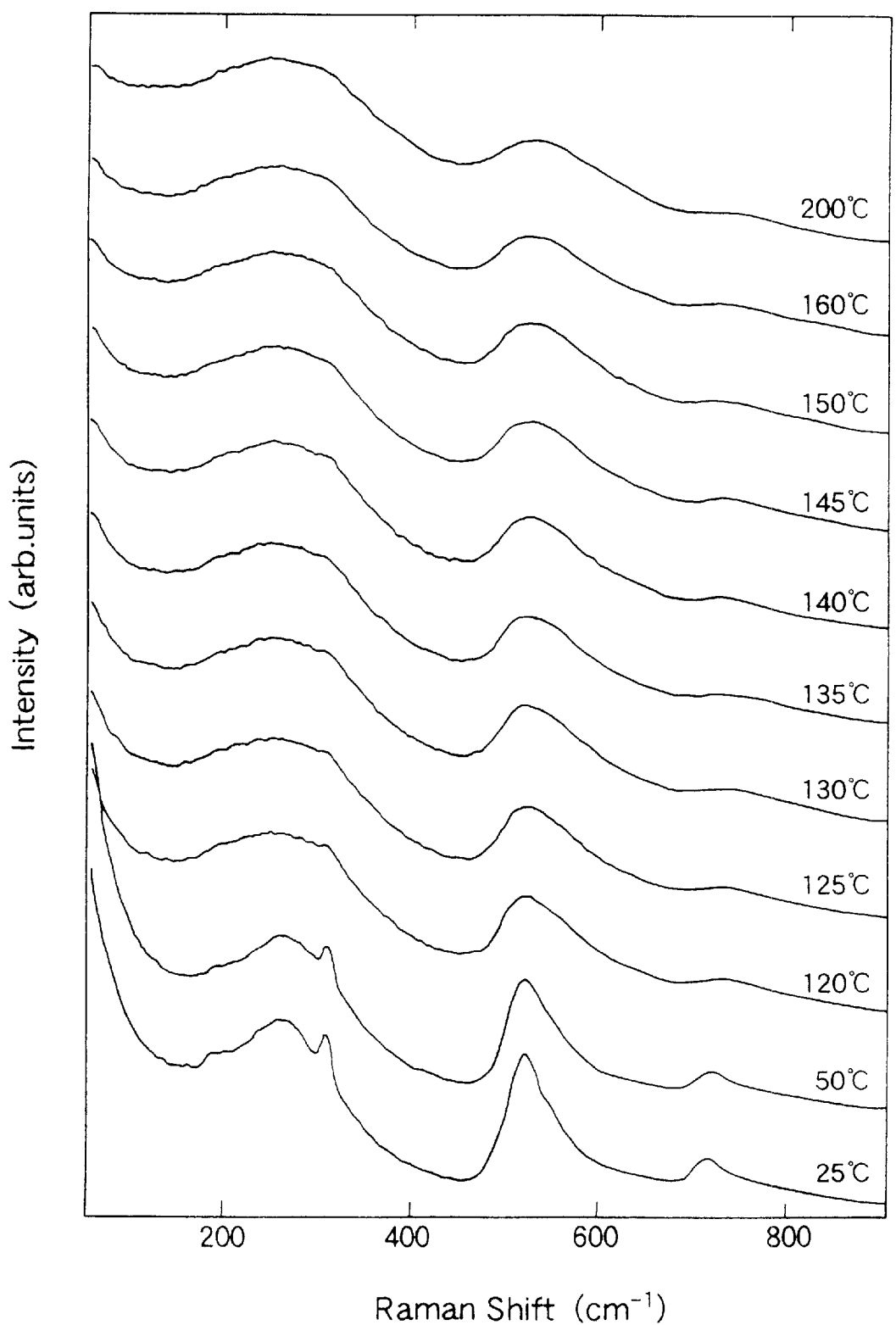
FIG. 12 is a graph of temperature changes of Raman spectrum of a disk-shaped sample (Sample 24)
Figure 13:
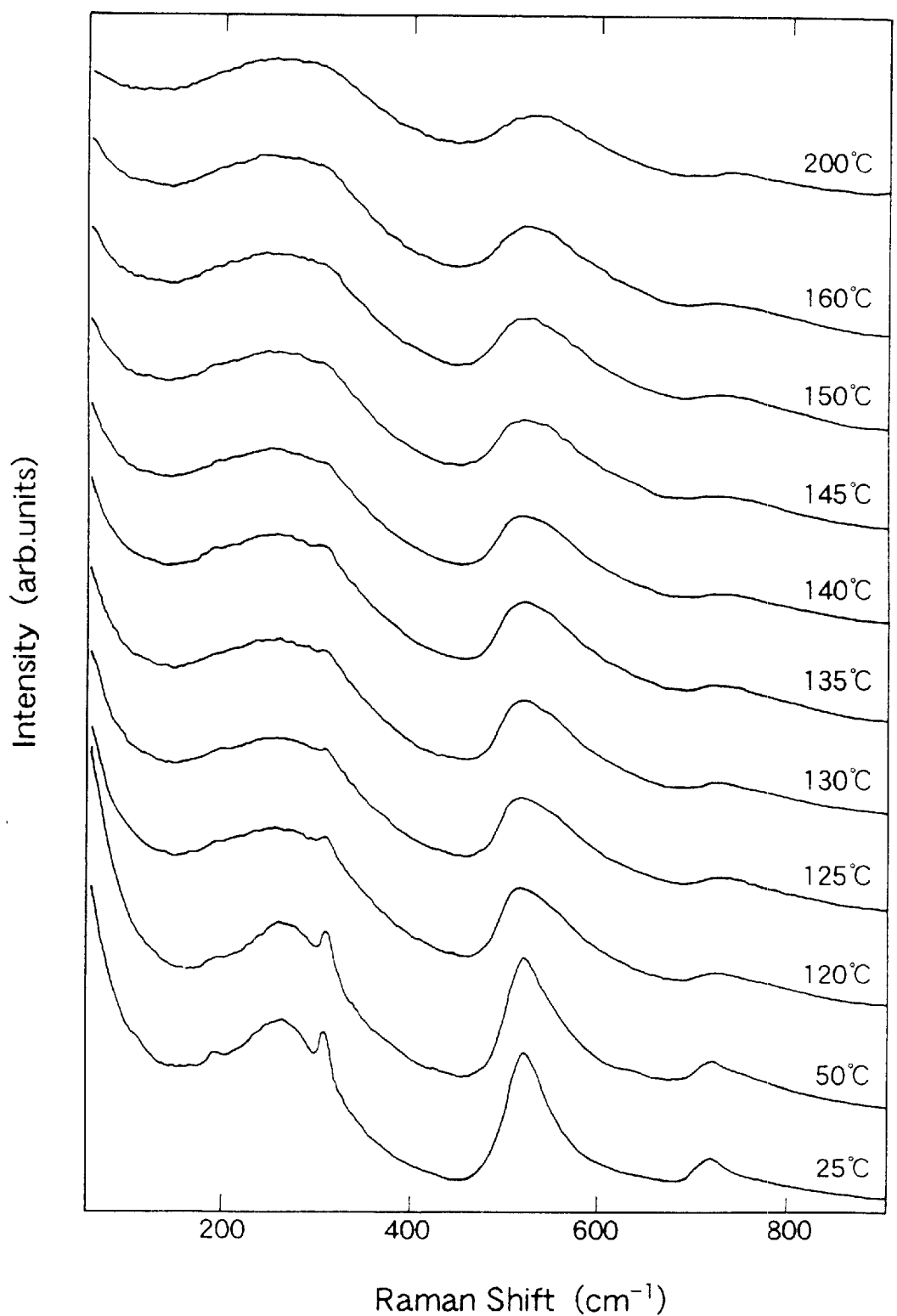
FIG. 13 is a graph of temperature changes of the Raman spectrum of a disk-shaped sample (Sample 28)

The disk-shaped samples (Samples 1, 5, 10, 14, 18, 23, 28, 33 and 39) were measured for their heat absorbing peak by the DSC so as to obtain a Curie temperature. Also, the half-width of the heat absorbing peak in the temperature-DSC graph was obtained. The results are shown in Table 4. Temperature-DDSC curves of samples in Table 4 are shown in FIG. 9.

Measurement by the Raman Spectrum Method

The sample temperature of the disk-shaped samples (Samples 1, 5, 24 and 28) was raised to 25° C., 50° C., 120° C., 125° C., 130° C., 135° C., 140° C., 145° C. and 150° C. by means of a temperature rise rate of 0.5° C./min. Which was further raised between 160° C. and 200° C. at a temperature rise of 1° C./min. by means of a Raman spectrum analysis apparatus (note that the temperatures were held for 20 minutes after reaching the determined temperatures). A single color light was emitted from a light source on the samples at the respective temperatures and a Raman peak position (unit is cm$^{-1}$), a half-width (unit is cm$^{-1}$), peak intensity (CPS) and relative peak intensity were measured or calculated.

The measurement conditions were that the light source for emission was arranged so that an emission angle with respect to the sample became about 60° and a light having an exciting wavelength of 514.5 nm, a laser power of 50 mW and having slits of 100 $\mu$m was emitted. The results at the sample temperature of 130° C. is shown in Table 5.

Figure 14:
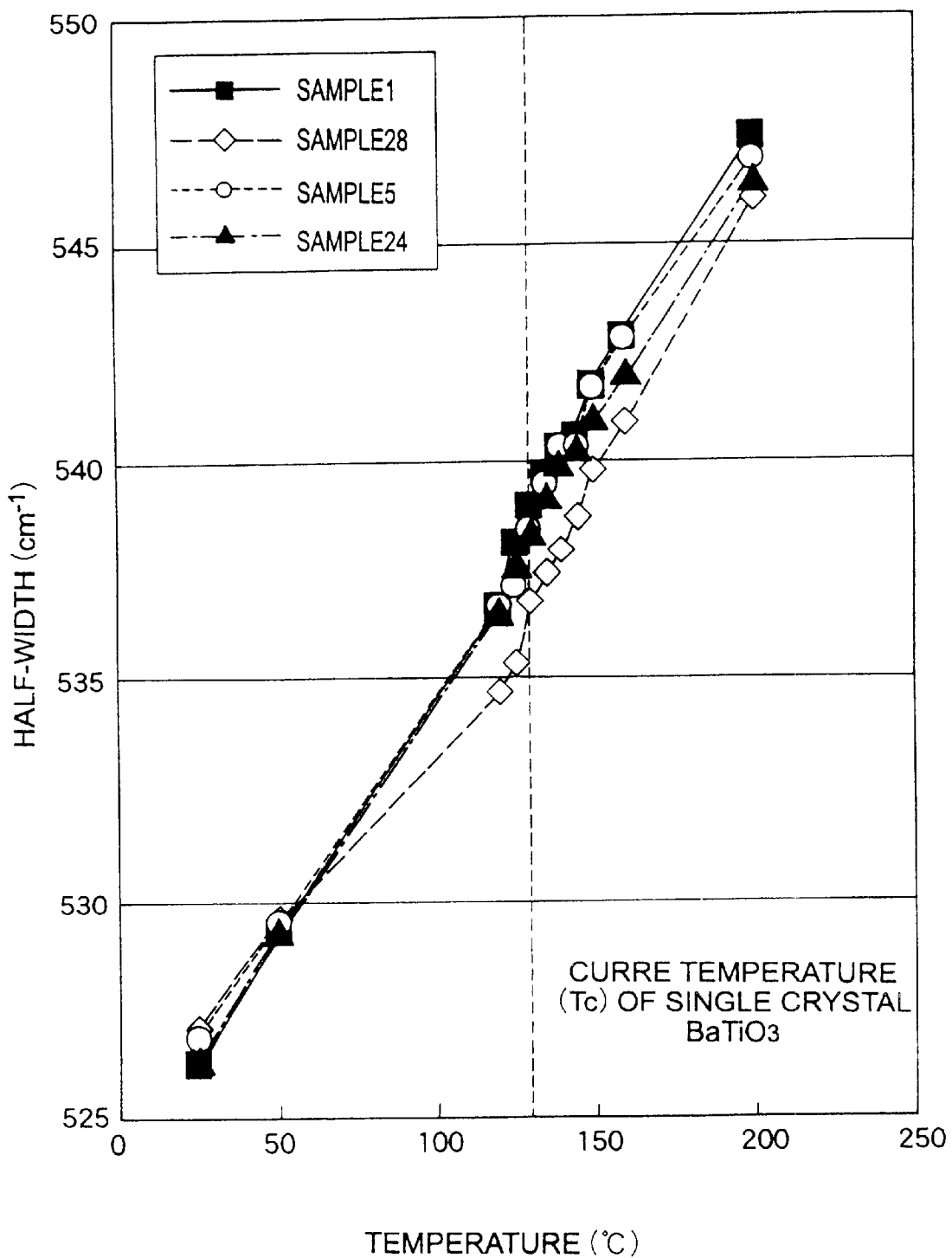
FIG. 14 is a graph of temperature dependency for a half-value width of the Raman line near a peak position 535 cm$^{-1}$.

When supposing that the Raman peak intensity in the peak position of 270 cm$^{-1}$ is $I_{270}$ and that in the peak position of 310 cm$^{-1}$ is $I_{310}$, it was examined whether the ratio of $I_{310}$ to $I_{270}$ being less than 0.1 was fulfilled. Those which fulfilled this requirement were checked ○ and those which did not were checked × in Table 5. Also, it was examined whether the half-width in the peak position of 535 cm$^{-1}$ was 95 cm$^{-1}$ or less, and those which fulfilled the condition were checked ○ and those which did not were checked × in Table 5. The temperature changes of the Raman spectrum of the samples shown in Table 6 are shown in FIGS. 10 to 13, while the temperature dependency of the half-width of the Raman line near the peak position of 535 cm$^{-1}$ is shown in FIG. 14.

TABLE 2

| Sample Number | Firing Temperature (°C.) | Permittivity εr | Dielectric Loss tan δ (%) | Specific Insulation Resistance IR (Ω cm) | CR product (MΩ μF) | Temperature Change Rate of Capacitance (ΔC) (%) −55° C. | +125° C. | +150° C. | X8R Characteristics |
|---|---|---|---|---|---|---|---|---|---|
| 1* | 1320 | 2184 | 1.2 | 4E + 12 | 773 | −3.3 | −13.6 | −24.3 | x |
| 5 | 1320 | 1543 | 1.2 | 3.5E + 12 | 492 | −4.3 | −0.1 | −11.8 | ○ |
| 8 | 1320 | 2123 | 1.2 | 4.3E + 12 | 808 | −3.2 | −8.8 | −14.4 | ○ |
| 9 | 1320 | 1689 | 1 | 4.3E + 12 | 643 | −2.1 | −0.7 | −10.5 | ○ |
| 10 | 1320 | 1535 | 1.2 | 4.4E + 12 | 596 | −3.2 | 0.8 | −9 | ○ |
| 11 | 1320 | 1801 | 0.9 | 3.9E + 12 | 614 | −3 | −1.5 | −12.4 | ○ |
| 12 | 1320 | 1878 | 1 | 4E + 12 | 687 | −2.8 | −1.1 | −9.4 | ○ |
| 13 | 1320 | 1768 | 1 | 4.3E + 12 | 673 | −3.3 | −0.8 | −8.5 | ○ |
| 14 | 1320 | 1536 | 1.1 | 5.1E + 12 | 691 | −3.2 | −2 | −7.7 | ○ |
| 15 | 1320 | 1761 | 0.9 | 4.6E + 12 | 724 | −3 | −3.4 | −6.2 | ○ |
| 16 | 1320 | 1842 | 1 | 4.8E + 12 | 76○ | −3.6 | −2 | −10.8 | ○ |
| 17 | 1320 | 1737 | 0.9 | 5.4E + 12 | 825 | −2.4 | −1.5 | −8.6 | ○ |
| 18 | 1320 | 1570 | 1.2 | 5.3E + 12 | 739 | −3.2 | 0.6 | −6.6 | ○ |
| 19 | 1320 | 1519 | 0.9 | 4.3E + 12 | 578 | −3.2 | −1.9 | −7.8 | ○ |
| 20 | 1320 | 1702 | 0.6 | 5.8E + 12 | 871 | −3.7 | −4.3 | −13.6 | ○ |
| 21 | 1320 | 1629 | 1 | 5.6E + 12 | 807 | −2.7 | −2.5 | −10.4 | ○ |
| 22 | 1320 | 1729 | 1 | 5.8E + 12 | 888 | −3.1 | −3 | −13.8 | ○ |
| 23 | 1320 | 1615 | 1.1 | 5.5E + 12 | 788 | −2.4 | −26 | −7.3 | ○ |
| 24* | 1320 | 2240 | 1.2 | 5.1E + 12 | 1011 | −0.8 | −13.8 | −19.3 | x |
| 25 | 1320 | 1734 | 1.1 | 6E + 12 | 918 | −1.9 | −4.1 | −9.1 | ○ |
| 26 | 1320 | 1751 | 1.1 | 6.2E + 12 | 854 | 0.7 | −5.3 | −12.7 | ○ |
| 27 | 1320 | 1435 | 1 | 7.3E + 12 | 929 | 0.5 | −4 | −11.2 | ○ |
| 28 | 1320 | 1575 | 1 | 6.4E + 12 | 889 | −2.5 | −4.3 | −9.3 | ○ |
| 29 | 1320 | 1332 | 0.9 | 2.8E + 12 | 330 | −3.2 | −8.3 | −11.4 | ○ |
| 30 | 1320 | 1573 | 1.1 | 6.4E + 12 | 1310 | 3.3 | −9.7 | −14.7 | ○ |
| 31 | 1320 | 1512 | 1 | 6.5E + 12 | 864 | 1.6 | −6.7 | −14 | ○ |
| 32 | 1320 | 1489 | 1 | 7.3E + 12 | 858 | 1.1 | −6.2 | −12.8 | ○ |
| 33 | 1320 | 1546 | 1.1 | 7.3E + 12 | 994 | −1.7 | −7.1 | −10.6 | ○ |
| 34* | 1320 | 2109 | 1.2 | 7.3E + 12 | 1363 | 4.4 | −14.6 | −21.4 | x |
| 35 | 1280 | 1988 | 1.1 | 7.6E + 12 | 1337 | −1.2 | −5.1 | −14.6 | ○ |
| 36 | 1280 | 1878 | 1.1 | 7.8E + 12 | 1304 | −1.1 | −4.4 | −14 | ○ |
| 37 | 1320 | 1665 | 1.1 | 7.2E + 12 | 1054 | 27 | −10.9 | −15 | ○ |
| 38 | 1320 | 1488 | 1 | 6.9E + 12 | 908 | 24 | −10 | −14.2 | ○ |
| 39 | 1320 | 1499 | 1.1 | 7.8E + 12 | 1031 | −1 | −10 | −12.6 | ○ |
| 40 | 1320 | 1427 | 0.6 | 5.4E + 12 | 682 | −1.9 | −9.5 | −10.3 | ○ |
| 41* | 1320 | 1552 | 0.9 | 9.9E + 12 | 1380 | 4.1 | −17.2 | −21.3 | x |
| 42* | 1320 | 1407 | 0.6 | 7.8E + 12 | 971 | 0.8 | −12.2 | −14.8 | ○ |
| 43* | 1320 | 1385 | 0.9 | 3.1E + 12 | 380 | −1.2 | −13.2 | −14 | ○ |

Samples with "*" indicate comparative samples of the present invention.

40

TABLE 3

| Sample Number | IR Lifetime (hours) | Direct-Current Break Down Voltage (V) | X-ray Diffraction 44~46° Half - Width | Intensity Rate | 98~103° Half - Width | Different Phase |
|---|---|---|---|---|---|---|
| 1* | 128 | 1225 | x | x | x | — |
| 5 | 40.8 | 1209 | ○ | ○ | ○ | ○ |
| 8 | 187 | 909 | ○ | ○ | ○ | — |
| 9 | 72 | 1301 | ○ | ○ | ○ | ○ |
| 10 | 42 | 1276 | ○ | ○ | ○ | ○ |
| 11 | 192 | 864 | ○ | ○ | ○ | — |
| 12 | 128.8 | 1193 | ○ | ○ | ○ | — |
| 13 | 68.8 | 1232 | ○ | ○ | ○ | — |
| 14 | 13.1 | 1574 | ○ | ○ | ○ | ○ |
| 15 | 128.5 | 1086 | ○ | ○ | ○ | — |
| 16 | 51 | 1654 | ○ | ○ | ○ | — |
| 17 | 43.2 | 1486 | ○ | ○ | ○ | — |
| 18 | 31.9 | 1583 | ○ | ○ | ○ | — |
| 19 | 10.2 | 1329 | ○ | ○ | ○ | ○ |
| 20 | 91.5 | 1114 | ○ | ○ | ○ | — |
| 21 | 34.4 | 1878 | ○ | ○ | ○ | — |
| 22 | 17.3 | 1737 | ○ | ○ | ○ | — |
| 23 | 13.7 | 1565 | ○ | ○ | ○ | — |
| 24* | 122 | 943 | x | x | x | — |
| 25 | 21.4 | 784 | ○ | ○ | ○ | — |

TABLE 3-continued

| Sample Number | IR Lifetime (hours) | Direct-Current Break Down Voltage (V) | X-ray Diffraction 44~46° Half - Width | X-ray Diffraction 44~46° Intensity Rate | 98~103° Half - Width | Different Phase |
|---|---|---|---|---|---|---|
| 26 | 8.5 | 1286 | ○ | ○ | ○ | — |
| 27 | 8.5 | 1642 | ○ | ○ | ○ | — |
| 28 | 6.4 | 1992 | ○ | ○ | ○ | — |
| 28 | 2.1 | 1085 | ○ | ○ | ○ | ○ |
| 30 | 25.5 | 782 | ○ | ○ | ○ | — |
| 31 | 4.8 | 772 | ○ | ○ | ○ | — |
| 32 | 3.4 | 1475 | ○ | ○ | ○ | — |
| 33 | 2.2 | 1725 | ○ | ○ | ○ | — |
| 34* | 68.2 | 753 | x | x | x | — |
| 35 | 34.5 | 820 | ○ | ○ | ○ | — |
| 36 | 19 | 808 | ○ | ○ | ○ | — |
| 37 | 2.4 | 882 | ○ | ○ | ○ | — |
| 38 | 1.7 | 993 | ○ | ○ | ○ | — |
| 39 | 1.2 | 1321 | ○ | ○ | ○ | — |
| 40 | 1.1 | 1225 | ○ | ○ | ○ | — |
| 41* | 12.2 | 822 | x | x | x | — |
| 42* | 0.9 | 1142 | x | x | x | — |
| 43* | 0.4 | 984 | x | x | x | — |

Samples with "*" indicate comparative examples of the present invention.

TABLE 4

| | $CaZrO_3$ (moles) | Curie Temperature (° C.) | DDSC Half-Width (°) |
|---|---|---|---|
| Sample 1* | 0 | 121 | 3.9 |
| Sample 5 | 0 | 124.9 | 14.7 |
| Sample 10 | 0.5 | 127 | 20.6 |
| Sample 14 | 1 | 125.9 | 19.6 |
| Sample 18 | 1.5 | 128.4 | 23.5 |
| Sample 23 | 2 | 131.5 | 25.5 |
| Sample 28 | 3 | 135.5 | 20.6 |
| Sample 33 | 4 | 134.1 | 21.6 |
| Sample 39 | 5 | 142.9 | 26.5 |

Samples with "*" indicate comparative examples of the present invention.

Review

In Table 2, "mE+n" indicates "m×10$^{+n}$" in values of specific insulation resistance (IR).

From the results in Table 2, all of the samples containing a predetermined amount of the fourth subcomponent and the fifth subcomponent of the present embodiment were confirmed to have a permittivity (∈r) that was not less than 1000 which was not reduced even by firing in a reduced atmosphere. Further, the nickel used as an internal electrode was not oxidized, and a dielectric composition being resistant to reducing was obtained, so that the capacitor-temperature characteristics fulfilled the X8R characteristics of the EIA standard. It was also confirmed that along with an increase of the amount of $CaZrO_3$, the capacity-temperature change rate in a high temperature region decreases.

TABLE 5

| Sample Number | Measurement Temperature (° C.) | Peak Number | Peak Position (cm$^{-1}$) | Half - Width (cm$^{-1}$) | Peak Intensity (CPS) | Relative Peak Intensity |
|---|---|---|---|---|---|---|
| 1* | 130 | 1 | 272 | 144.7 | 301 | 1 |
| | 130 | 2 | 310 | 12.4 | 21.7 | 0.072(x) |
| | 130 | 3 | 539 | 97.6(x) | 244.6 | 0.812 |
| | 130 | 4 | — | — | — | |
| | 130 | 5 | 747 | 83.9 | 59.4 | 0.197 |
| 2B | 130 | 1 | 273 | 140.1 | 484.1 | 1 |
| | 130 | 2 | 312 | 18 | 92.1 | 0.191(○) |
| | 130 | 3 | 537 | 91.1(○) | 469.6. | 0.97 |
| | 130 | 4 | 731 | 38.5 | 32.3 | 0.067 |
| | 130 | 5 | 751 | 100 | 58.5 | 0.121 |
| 5 | 130 | 1 | 271 | 143 | 790.6 | 1 |
| | 130 | 2 | 314 | 18 | 123 | 0.155(○) |
| | 130 | 3 | 538 | 96.1(x) | 680.3 | 0.861 |
| | 130 | 4 | — | — | — | |
| | 130 | 5 | 746 | 100 | 97.1 | 0.123 |
| 24* | 130 | 1 | 271 | 144.6 | 271.1 | 1 |
| | 130 | 2 | 310 | 12.4 | 17.9 | 0.066(x) |
| | 130 | 3 | 538 | 96.4(x) | 215.1 | 1.393 |
| | 130 | 4 | — | — | — | |
| | 130 | 5 | 748 | 83.7 | 53.5 | 1.481 |

Samples with "*" indicate comparative examples of the present invention.

It is confirmed also from the result in FIG. 4 that all of the samples of the present embodiment containing $CaZrO_3$ fulfilled the X8R characteristics.

It is understood from the results in FIG. 5 that the Curie temperature shifts to a higher temperature as the amount of $CaZrO_3$ increases. Namely, it can be seen from FIGS. 4 and 5 that the Curie temperature shifts to a high temperature as the amount of $CaZrO_3$ increases, and as a result, the capacity-temperature characteristics become flat. Note that the samples in the present embodiment fulfilled the B characteristics of the EIAJ and the X7R characteristics of the EIA standard as explained above, as well.

It was confirmed from the results in Table 2 that the samples of the present embodiment have a dielectric loss (tan δ) of not more than 10%, a specific insulation resistance (IR) of $1 \times 10^{12} \Omega cm$ or more, a CR product of 500 M $\Omega \mu f$ or more, and have an excellent capacitor characteristics.

It is understood from the results in FIG. 3 that the CR product increases as the amount of $CaZrO_3$ increases, but it is also understood that the CR product decreases if the amount exceeds 5 moles (Sample 42).

It was confirmed from the results in Table 3 that the samples of the present embodiment can obtain a sufficient IR lifetime. Note that it can be said that the lifetime is sufficient when it is one hour or more under the conditions.

It was confirmed from the results in Table 3 that the samples in the present embodiment have a direct current break down voltage of $70V/\mu m$ or more and have sufficient direct current break down strength.

It is understood from the results in FIGS. 6 and 7, that the samples of the present embodiment fulfill the conditions limited in the present invention with regards to the relationship between the intensity of the half-width and both peaks in the X-ray diffraction.

Note that the same evaluation was obtained as a result of evaluating the capacitor samples in the same way. In this case, the measurement and evaluation were made on a part where the electrode portion of the capacitor sample was not exposed.

It was confirmed from the results in FIG. 8 that the capacitance did not decrease even if a higher voltage was applied on the samples of the present embodiment compared to samples of comparative examples and there are excellent DC bias characteristics.

It is understood from Table 4 that the samples of the present embodiment have a half-width of a heat peak of 4.1° or more in the temperature-DSC graph.

Note that it was confirmed that along with an increase in the amount of $CazrO_3$, the peak half-width becomes wider, the Curie temperature shifts to a higher temperature, and improvements in temperature characteristics was observed.

It is understood from the results in Table 5 that the samples of the present embodiment have ($I_{310}/I_{270}$) of not less than 0.1 and a half-width of the Raman peak of 95 $cm^{-1}$ at the peak position of 535 $cm^{-1}$.

Note that as a result of evaluating the capacitor samples in the same way, the same evaluations were obtained. In this case, the measurement and evaluation were made on a part where the electrode portion of the capacitor sample was not exposed.

EXAMPLE 2

Samples were prepared in the same way as in the example 1 except that the number of moles of the fifth subcomponent ($CaZrO_3$) was fixed (1.5 moles) and the number of moles in a Yb conversion of the fourth subcomponent ($Yb_2O_3$) was distributed as shown in Table 6, and the same measurement was made as in the example 1. The results are shown in Tables 7 and 8.

TABLE 6

| | Subcomponent | | |
|---|---|---|---|
| Sample Number | $Yb_2O_3$ (moles) | Fourth Yb Conversion (moles) | Fifth $CaZrO_3$ (moles) |
| 15-1* | 0 | 0 | 1.5 |
| 15-2 | 0.25 | 0.5 | 1.5 |
| 15-3 | 0.5 | 1 | 1.5 |
| 15 | 1 | 2 | 1.5 |
| 16 | 1.5 | 3 | 1.5 |
| 17 | 1.75 | 3.5 | 1.5 |
| 18 | 2.13 | 4.26 | 1.5 |
| 19 | 2.5 | 5 | 1.5 |
| 19-1 | 3.5 | 7 | 1.5 |
| 19-2* | 4 | 8 | 1.5 |

Samples with "*" indicate comparative examples of the present invention.

TABLE 7

| Sample Number | Firing Temperature (° C.) | Permittivity ε r | Dielectric Loss tan δ (%) | Specific Insulation Resistance IR (Ωcm) | CR Product (MΩ μF) | Temperature Change Rate of Capacitance (ΔC) (%) | | | X8R Characteristics |
|---|---|---|---|---|---|---|---|---|---|
| | | | | | | −55° C. | +125° C. | +150° C. | |
| 15-1* | 1320 | 2176 | 1.2 | 5.1E + 12 | 984 | −3.8 | −5.5 | −21.6 | x |
| 15-2 | 1320 | 1983 | 1.1 | 4.9E + 12 | 853 | −3.1 | −5.2 | −17.1 | x |
| 15-3 | 1320 | 1884 | 1 | 5.1E + 12 | 850 | −3 | −4.4 | −14.8 | ο |
| 15 | 1320 | 1761 | 0.9 | 4.6E + 12 | 724 | −3 | −3.4 | −6.2 | ο |
| 16 | 1320 | 1842 | 1 | 4.8E + 12 | 790 | −3.6 | −2 | −10.8 | ο |
| 17 | 1320 | 1737 | 0.9 | 5.4E + 12 | 825 | −2.4 | −1.5 | −8.6 | ο |
| 18 | 1320 | 1570 | 1.1 | 5.3E + 12 | 739 | −3.2 | −0.6 | −6.6 | ο |
| 19 | 1320 | 1519 | 0.9 | 4.3E + 12 | 578 | −3.2 | −1.9 | −7.6 | ο |
| 19-1 | 1320 | 1361 | 0.8 | 2.5E + 12 | 301 | −3.4 | 0.4 | −6 | ο |
| 19-2* | 1320 | 1285 | 0.81 | 1.06E + 12 | 121 | −3.3 | 1.1 | −0.2 | ο |

Samples with "*" indicate comparative examples of the present invention.

TABLE 8

| Sample Number | IR Lifetime (hours) | Direct-current Break Down Voltage (V) | X-ray Diffraction 44~46° Half - Width | X-ray Diffraction 44~46° Intensity Rate | X-ray Diffraction 98~103° Half - Width | Different Phase |
|---|---|---|---|---|---|---|
| 15-1* | 133.5 | 1210 | x | x | x | — |
| 15-2 | 126.4 | 1201 | ○ | ○ | ○ | — |
| 15-3 | 191.4 | 1130 | ○ | ○ | ○ | — |
| 15 | 128.5 | 1086 | ○ | ○ | ○ | — |
| 16 | 51 | 1654 | ○ | ○ | ○ | — |
| 17 | 43.2 | 1466 | ○ | ○ | ○ | — |
| 18 | 31.9 | 1583 | ○ | ○ | ○ | — |
| 19 | 10.2 | 1329 | ○ | ○ | ○ | ○ |
| 19-1 | 3.1 | 1004 | ○ | ○ | ○ | ○ |
| 19-2* | 0.3 | 921 | x | x | x | ○ |

Samples with "*" indicate comparative examples of the present invention.

It was confirmed as shown in Tables 7 and 8 that the effects of the present invention can be realized when in the range of the present invention (Samples 15-2 to 19-1).

EXAMPLE 3

Samples were prepared in the same way as in Sample 17 in the example 1 except that the ratio of Ca to Zr in $CaZrO_3$ as the fifth subcomponent was changed by 0.1 from 0.5 to 1.5. The same measurements as in the example 1 were made on the samples. It was confirmed that the effect of the present invention was realized regardless of the ratio of Ca and Zr in the seventh subcomponent.

EXAMPLE 4

A sample (Sample 17-1) was prepared in the same way as in the Sample 17 in the example 1 as shown in Table 9 except that the $Y_2O_3$ as the sixth subcomponent was increased by 2.5 moles (5 moles in Y conversion). The same measurements as in the example 1 were made on the sample. The results are shown in Tables 10 and 11 and almost the same results as in the example 1 were obtained. Note that it was confirmed that no adverse effects on other characteristics were observed even if an additional amount of $Y_2O_3$ was added.

EXAMPLE 5

A sample (Sample 17-2) was prepared in the same way as in the Sample 17 in the example 1 as shown in Table 9 except that the $Y_2O_3$ as the sixth subcomponent was not added. The same measurements as in the example 1 were made on the sample. The results are shown in Tables 10 and 11 and almost the same results as in the example 1 were obtained.

EXAMPLE 6

A sample (Sample 17-3) was prepared in the same way as in the Sample 17 in the example 1 as shown in Table 9 except that the $MnCO_3$ as the seventh subcomponent was not added. The same measurements as in the example 1 were made on the sample. The results are shown in Tables 10 and 11 and almost the same results as in the example 1 were obtained.

TABLE 9

| | Main Component | Subcomponent First | Subcomponent Second | Subcomponent Third | Subcomponent Fourth | Subcomponent Fourth | Subcomponent Fifth | Subcomponent Sixth | Subcomponent Sixth | Subcomponent Seventh |
|---|---|---|---|---|---|---|---|---|---|---|
| Sample Number | $BaTiO_3$ (moles) | $MgCO_3$ (moles) | $(Ba_{0.6}, Ca_{0.4})SiO_3$ (moles) | $V_2O_5$ (moles) | $Yb_2O_3$ (moles) | Yb Conversion (moles) | $CaZrO_3$ (moles) | $Y_2O_3$ (moles) | Y Conversion (moles) | $MnCO_3$ (moles) |
| 17 | 100 | 1 | 3 | 0.1 | 1.75 | 3.5 | 1.5 | 2 | 4 | 0.374 |
| 17-1 | 100 | 1 | 3 | 0.1 | 1.75 | 3.5 | 1.5 | 2.5 | 5 | 0.374 |
| 17-2 | 100 | 1 | 3 | 0.1 | 1.75 | 3.5 | 1.5 | 0 | 0 | 0.374 |
| 17-3 | 100 | 1 | 3 | 0.1 | 1.75 | 3.5 | 1.5 | 2 | 4 | 0 |

Samples with "*" indicate comparative examples of the present invention.

TABLE 10

| Sample Number | Firing Temperature (° C.) | Permittivity $\epsilon r$ | Dielectric Loss (%) | Specific Insulation Resistance IR($\Omega$cm) | CR Product (M$\Omega$ $\mu$F) | Temperature Change Rate of Capacitance ($\Delta$C) (%) -55° C. | Temperature Change Rate of Capacitance ($\Delta$C) (%) +125° C. | Temperature Change Rate of Capacitance ($\Delta$C) (%) +150° C. | X8R Characteristics |
|---|---|---|---|---|---|---|---|---|---|
| 17 | 1320 | 1737 | 0.9 | 5.4E + 12 | 825 | -2.4 | -1.5 | -8.6 | ○ |
| 17-1 | 1340 | 1771 | 1 | 5.7E + 12 | 886 | -3 | -5.1 | -10.4 | ○ |
| 17-2 | 1280 | 2127 | 0.9 | 6.2E + 12 | 1159 | -3.1 | -4.3 | -13.2 | ○ |
| 17-3 | 1320 | 1801 | 1.9 | 5E + 12 | 791 | -2.6 | -1.1 | -7.7 | ○ |

TABLE 11

| Sample Number | IR Lifetime (hours) | Direct-current Break Down Voltage (V) | X-ray Diffraction 44~46° Half - Width | X-ray Diffraction 44~46° Intensity Rate | X-ray Diffraction 98~103° Half - Width | Different Phase |
|---|---|---|---|---|---|---|
| 17 | 43.2 | 1466 | ○ | ○ | ○ | — |
| 17-1 | 89.8 | 1488 | ○ | ○ | ○ | — |
| 17-2 | 12.1 | 1154 | ○ | ○ | ○ | — |
| 17-3 | 24 | 1466 | ○ | ○ | ○ | — |

What is claimed is:

1. A dielectric ceramic composition comprising:
a main component composed mainly of barium titanate,
a first subcomponent including at least one compound selected from MgO, CaO, BaO, SrO and $Cr_2O_3$,
a second subcomponent containing silicone oxide as a main composition,
a third subcomponent including at least one compound selected from $V_2O_5$, $MoO_3$, and $WO_3$,
a fourth subcomponent including an oxide of R1 (where R1 is at least one element selected from Sc, Er, Tm, Yb, and Lu), and
a fifth subcomponent including $CaZrO_3$ or $CaO+ZrO_2$,
wherein the ratios of the subcomponents to 100 moles of the main component composed mainly of barium titanate are:
the first subcomponent: 0.1 to 3 moles,
the second subcomponent: 2 to 10 moles,
the third subcomponent: 0.01 to 0.5 moles,
the fourth subcomponent: 0.5 to 7 moles (where the number of moles of the fourth subcomponent is the ratio of R1 alone), and
the fifth subcomponent: 0<fifth subcomponent≦5 moles.

2. The dielectric ceramic composition as set forth in claim 1, wherein when the number of moles of the fourth subcomponent and the fifth subcomponent with respect to 100 moles of the main component composed mainly of barium titanate (where the mole number of the fourth subcomponent is the ratio of R1 alone) is expressed by X, Y coordinates, the number of moles of the fourth subcomponent and the fifth subcomponent have the relationship of being within the range surrounded by straight lines of Y=5, Y=0, Y=(2/3)X−(7/3), X=0.5 and X=5 (where the boundary of Y=0 is not included).

3. The dielectric ceramic composition as set forth in claim 2, further comprising a seventh subcomponent MnO, the amount of the seventh subcomponent being not more than 0.5 moles with respect to 100 moles of the main component composed mainly of barium titanate.

4. The dielectric ceramic composition as set forth in claim 2, wherein said second subcomponent is at least one compound selected from $SiO_2$, MO (where M is at least one element selected from Ba, Ca, Sr and Mg), $Li_2O$ and $B_2O_3$.

5. The dielectric ceramic composition as set forth in claim 2, further comprising a sixth subcomponent an oxide of R2 (where the R2 is at least one element selected from Y, Dy, Ho, Tb, Gd and Eu) and an amount of said sixth subcomponent is not more than 9 moles with respect to 100 moles of the main component composed mainly of barium titanate (where the mole number of the sixth subcomponent is the ratio of R2 alone).

6. The dielectric ceramic composition as set forth in claim 5, wherein a total amount of the fourth subcomponent and the sixth subcomponent is not more than 13 moles with respect to 100 moles of main component composed mainly of barium titanate (where the mole numbers of the fourth subcomponent and sixth subcomponent are respectively the ratios of R1 and R2 alone).

7. The dielectric ceramic composition as set forth in claim 1, wherein when the number of moles of the fourth subcomponent and the fifth subcomponent with respect to 100 moles of the main component composed mainly of barium titanate (where the mole number of the fourth subcomponent is the ratio of R1 alone) is expressed by X, Y coordinates, the number of moles of the fourth subcomponent and the fifth subcomponent have the relationship of being within the range surrounded by straight lines of Y=5, Y=0, Y=(2/3)X−(7/3), Y=−(1.5)X+9.5, X=1 and X=5 (where the boundary of Y=0 is not included).

8. The dielectric ceramic composition as set forth in claim 7, further comprising a sixth subcomponent an oxide of R2 (where the R2 is at least one element selected from Y, Dy, Ho, Tb, Gd and Eu) and an amount of said sixth subcomponent is not more than 9 moles with respect to 100 moles of the main component composed mainly of barium titanate (where the mole number of the sixth subcomponent is the ratio of R2 alone).

9. The dielectric ceramic composition as set forth in claim 7, wherein said second subcomponent is at least one compound selected from $SiO_2$, MO (where M is at least one element selected from Ba, Ca, Sr and Mg), $Li_2O$ and $B_2O_3$.

10. The dielectric ceramic composition as set forth in claim 7, further comprising a seventh subcomponent MnO, the amount of the seventh subcomponent being not more than 0.5 moles with respect to 100 moles of the main component composed mainly of barium titanate.

11. The dielectric ceramic composition as set forth in claim 8, wherein a total amount of the fourth subcomponent and the sixth subcomponent is not more than 13 moles with respect to 100 moles of main component composed mainly of barium titanate (where the mole numbers of the fourth subcomponent and sixth subcomponent are respectively the ratios of R1 and R2 alone).

12. The dielectric ceramic composition as set forth in claim 1, further comprising a sixth subcomponent an oxide of R2 (where the R2 is at least one element selected from Y, Dy, Ho, Tb, Gd and Eu) and an amount of said sixth subcomponent is not more than 9 moles with respect to 100 moles of the main component composed mainly of barium titanate (where the mole number of the sixth subcomponent is the ratio of R2 alone).

13. The dielectric ceramic composition as set forth in claim 12, wherein a total amount of the fourth subcomponent and the sixth subcomponent is not more than 13 moles with respect to 100 moles of main component composed mainly of barium titanate (where the mole numbers of the fourth subcomponent and sixth subcomponent are respectively the ratios of R1 and R2 alone).

14. The dielectric ceramic composition as set forth in claim 1, wherein said second subcomponent is at least one compound selected from $SiO_2$, MO (where M is at least one element selected from Ba, Ca, Sr and Mg), $Li_2O$ and $B_2O_3$.

15. The dielectric ceramic composition as set forth in claim 1, further comprising a seventh subcomponent MnO, the amount of the seventh subcomponent being not more than 0.5 moles with respect to 100 moles of the main component composed mainly of barium titanate.

16. A dielectric ceramic composition comprising a main component composed mainly of barium titanate, wherein
when a value of a heat flow difference (dq/dt) per an unit time measured by the DSC (differential scan calorimetry), which is differentiated by a temperature, is defined as a DDSC (Differential Calorimetry Differentiated by Temperature), a temperature difference between a pair of peaks existing on the both sides of the Curie temperature is not less than 4.1° C. in a graph showing the relationship between temperature and the DDSC (Differential Calorimetry Differentiated by Temperature).

17. A dielectric ceramic composition comprising a main component composed mainly of barium titanate, wherein:
a pseudo cubic peak including a peak of a (002) crystal surface and a peak of a (200) crystal surface is observed in a range 2θ=44° to 46° in an X-ray diffraction using a Cu—kα line;
a half-width of said pseudo cubic peak is not less than 0.30 at room temperature; and
when determining the intensity of said peak of the (002) crystal surface is I(002) and the intensity of said peak of the (200) crystal surface is I(200), I(002)≧I(200).

18. A dielectric ceramic composition comprising a main component composed mainly of barium titanate, wherein:
a pseudo cubic peak including a peak of a (004) crystal surface and a peak of a (400) crystal surface is observed in a range 2θ=98 to 103° in an X-ray diffraction using a Cu—kα line; and
a half-width of said pseudo cubic peak is not less than 0.4° at 120° C.

19. A dielectric ceramic composition comprising a main component composed mainly of barium titanate, wherein:
when the dielectric ceramic composition is measured by means of a Raman spectrum method using various sample temperatures, the intensity of the Raman peak at 270 cm$^{-1}$ and 130° C. is defined as I270 and the intensity of the Raman peak at 310 cm$^{-1}$ and 130° C. is defined as $I_{310}$, $0.1 \leq (I_{310}/I_{270})$.

20. A dielectric ceramic composition comprising a main component composed mainly of barium titanate, wherein:
when the dielectric ceramic composition is measured by means of a Raman spectrum method using various sample temperatures,
a half-width of the Raman peak at 535 cm$^{-1}$ is not more than 95 cm$^{-1}$ at the sample temperature of 130° C.

21. An electric device having a dielectric layer comprised of a dielectric ceramic composition, wherein said dielectric ceramic composition comprises:
a main component composed mainly of barium titanate,
a first subcomponent including at least one compound selected from MgO, CaO, BaO, SrO and $Cr_2O_3$,
a second subcomponent containing silicone oxide as a main composition,
a third subcomponent including at least one compound selected from $V_2O_5$ $MoO_3$, and $WO_3$,
a fourth subcomponent including an oxide of R1 (where R1 is at least one element selected from Sc, Er, Tm, Yb, and Lu), and
a fifth subcomponent including $CazrO_3$ or $CaO+ZrO_2$,
and the ratios of the subcomponents to 100 moles of the main component composed mainly of barium titanate are:
the first subcomponent: 0.1 to 3 moles,
the second subcomponent: 2 to 10 moles,
the third subcomponent: 0.01 to 0.5 moles,
the fourth subcomponent: 0.5 to 7 moles (where the number of moles of the fourth subcomponent is the ratio of R1 alone), and
the fifth subcomponent: 0<fifth subcomponent≦5 moles.

22. An electric device having a dielectric layer comprised of a dielectric ceramic composition comprising a main component composed mainly of barium titanate, wherein said dielectric ceramic composition is:
when a value of a heat flow difference (dq/dt) per an unit time measured by the DSC (differential scan calorimetry), which is differentiated by a temperature, is defined as a DDSC (Differential Calorimetry Differentiated by Temperature), a temperature difference between a pair of peaks existing on the both sides of the Curie temperature is not less than 4.1° C. in a graph showing the relationship between temperature and the DDSC (Differential Calorimetry Differentiated by Temperature).

23. An electric device having a dielectric layer comprised of a dielectric ceramic composition comprising a main component composed mainly of barium titanate, wherein said dielectric ceramic composition is:
a pseudo cubic peak including a peak of a (002) crystal surface and a peak of a (200) crystal surface is observed in a range 2θ=44° to 46° in an X-ray diffraction using a Cu—kα line;
a half-width of said pseudo cubic peak is not less than 0.3° at room temperature; and
when determining the intensity of said peak of the (002) crystal surface is I(002) and the intensity of said peak of the (200) crystal surface is I(200), I(002)≧I(200).

24. An electric device having a dielectric layer comprised of a dielectric ceramic composition comprising a main component composed mainly of barium titanate, wherein said dielectric ceramic composition is:
a pseudo cubic peak including a peak of a (004) crystal surface and a peak of a (400) crystal surface is observed in a range 2θ=98° to 103° in an X-ray diffraction using a Cu—kα line; and
a half-width of said pseudo cubic peak is not less than 0.40 at 120° C.

25. An electric device having a dielectric layer comprised of a dielectric ceramic composition comprising a main component composed mainly of barium titanate, wherein said dielectric ceramic composition is:
when the dielectric ceramic composition is measured by means of a Raman spectrum method using various sample temperatures, the intensity of the Raman peak at 270 cm$^{-1}$ and 130° C. is defined as $I_{270}$ and the intensity of the Raman peak at 310 cm$^{-1}$ and 130° C. is defined as $I_{310}$, $0.1 \leq (I_{310}/I_{270})$.

26. An electric device having a dielectric layer comprised of a dielectric ceramic composition comprising a main component composed mainly of barium titanate, wherein said dielectric ceramic composition is:

when the dielectric ceramic composition is measured by means of a Raman spectrum method using various sample temperatures, a half-width of the Raman peak at 535 cm$^{-1}$ is not more than 95 cm$^{-1}$ at the sample temperature of 130° C.

27. The electric device as set forth in claim 21, comprising a capacitor device body wherein said dielectric layers and internal electrode layers are alternately layered.

28. The electric device as set forth in claim 22, comprising a capacitor device body wherein said dielectric layers and internal electrode layers are alternately layered.

29. The electric device as set forth in claim 23, comprising a capacitor device body wherein said dielectric layers and internal electrode layers are alternately layered.

30. The electric device as set forth in claim 24, comprising a capacitor device body wherein said dielectric layers and internal electrode layers are alternately layered.

31. The electric device as set forth in claim 25, comprising a capacitor device body wherein said dielectric layers and internal electrode layers are alternately layered.

32. The electric device as set forth in claim 26, comprising a capacitor device body wherein said dielectric layers and internal electrode layers are alternately layered.

33. The electric device as set forth in claim 27, wherein a conductive material included in said internal electrode layer is Ni or Ni alloy.

34. The electric device as set forth in claim 28, wherein a conductive material included in said internal electrode layer is Ni or Ni alloy.

35. The electric device as set forth in claim 29, wherein a conductive material included in said internal electrode layer is Ni or Ni alloy.

36. The electric device as set forth in claim 30, wherein a conductive material included in said internal electrode layer is Ni or Ni alloy.

37. The electric device as set forth in claim 31, wherein a conductive material included in said internal electrode layer is Ni or Ni alloy.

38. The electric device as set forth in claim 32, wherein a conductive material included in said internal electrode layer is Ni or Ni alloy.

* * * * *